United States Patent
Astrakhan

(10) Patent No.: US 12,454,580 B2
(45) Date of Patent: Oct. 28, 2025

(54) FRB ANTIBODIES

(71) Applicant: Regeneron Pharmaceuticals, Inc., Tarrytown, NY (US)

(72) Inventor: Alexander Astrakhan, Seattle, WA (US)

(73) Assignee: Regeneron Pharmaceuticals, Inc., Tarrytown, NY (US)

(*) Notice: Subject to any disclaimer, the term of this patent is extended or adjusted under 35 U.S.C. 154(b) by 586 days.

(21) Appl. No.: 17/917,418

(22) PCT Filed: Apr. 9, 2021

(86) PCT No.: PCT/US2021/026597
§ 371 (c)(1),
(2) Date: Oct. 6, 2022

(87) PCT Pub. No.: WO2021/207613
PCT Pub. Date: Oct. 14, 2021

(65) Prior Publication Data
US 2023/0151117 A1    May 18, 2023

Related U.S. Application Data

(60) Provisional application No. 63/007,990, filed on Apr. 10, 2020.

(51) Int. Cl.
*C07K 16/40*    (2006.01)

(52) U.S. Cl.
CPC ........ *C07K 16/40* (2013.01); *C07K 2317/565* (2013.01); *C07K 2317/622* (2013.01); *C07K 2319/60* (2013.01)

(58) Field of Classification Search
None
See application file for complete search history.

(56) References Cited

U.S. PATENT DOCUMENTS

| | | |
|---|---|---|
| 2007/0154966 A1 | 7/2007 | Sagi-Eisenberg |
| 2009/0291077 A1 | 11/2009 | Smith et al. |
| 2012/0225060 A1 | 9/2012 | Lee et al. |
| 2015/0140003 A1 | 5/2015 | Kaluza et al. |

FOREIGN PATENT DOCUMENTS

WO    2018/203567 A1    11/2018

OTHER PUBLICATIONS

Lanning et al., Intestinal microflora and diversification of the rabbit antibody repertoire. J Immunol. Aug. 15, 2000;165 (4):2012-9.
International Search Report and Written Opinion for Application No. PCT/US2021/026597, dated Sep. 17, 2021, 9 pages.

*Primary Examiner* — Daniel E Kolker
*Assistant Examiner* — Julia A Rossi
(74) *Attorney, Agent, or Firm* — McCarter & English, LLP; Marcie B. Clarke; Dylan M. Blumenthal

(57) ABSTRACT

The invention provides anti-FRB antibodies or antigen binding fragments thereof that bind an FRB polypeptide.

20 Claims, 16 Drawing Sheets
Specification includes a Sequence Listing.

Clone: 2H1/2K1

16 μg/mL — DARIC transduced T

8 μg/mL — DARIC transduced T

16 μg/mL — untransduced T cells

8 μg/mL — untransduced T cells

Clone: 2H1/2K1

4 μg/mL  1.6 μg/mL

DARIC transduced T untransduced T cells

Clone: 2H1/2K1

0.8 μg/mL          0.4 μg/mL

DARIC transduced T untransduced T cells

Clone: 3H3/3K1

16 μg/mL          8 μg/mL

DARIC transduced T cells untransduced T cells

Clone: 3H3/3K1

4 μg/mL        1.6 μg/mL

DARIC transduced T cells untransduced T cells

Clone: 3H3/3K1

0.8 μg/mL 0.4 μg/mL

DARIC transduced T cells untransduced T cells

Clone: 5H1/5K1

16 µg/mL

8 µg/mL

DARIC transduced T cells untransduced T cells

Clone: 5H1/5K1

4 μg/mL          1.6 μg/mL

DARIC transduced T cells untransduced T cells

Clone: 5H1/5K1

0.8 μg/mL          0.4 μg/mL

DARIC transduced T cells untransduced T cells

Clone: 6H2/6K3

16 μg/mL          8 μg/mL

DARIC transduced T cells untransduced T cells

Clone: 6H2/6K3

4 μg/mL          1.6 μg/mL untransduced T cells

Clone: 6H2/6K3 untransduced T cells

Clone: 9H2/9K3

16 µg/mL | 8 µg/mL

DARIC transduced T cells untransduced T cells

Clone: 9H2/9K3

DARIC transduced T cells untransduced T cells

Clone: 9H2/9K3

DARIC transduced T cells untransduced T cells

FRB ANTIBODIES

CROSS REFERENCE TO RELATED APPLICATIONS

This application is a National Stage application under 35 U.S.C. § 371 of International Application No. PCT/US2021/026597, filed Apr. 9, 2021, which claims the benefit under 35 U.S.C. § 119 (e) of U.S. Provisional Application No. 63/007,990, filed Apr. 10, 2020, which is incorporated by reference herein in its entirety.

STATEMENT REGARDING SEQUENCE LISTING

The Sequence Listing associated with this application is provided in text format in lieu of a paper copy and is hereby incorporated by reference into the specification. The name of the text file containing the Sequence Listing is BLUE-129_PC_ST25.txt. The text file is 24 KB, created on Apr. 9, 2021, and is being submitted electronically via EFS-Web, concurrent with the filing of the specification.

BACKGROUND

Technical Field

The present invention relates to FK506-binding protein (FKBP) rapamycin binding (FRB) polypeptide antibodies or antigen binding fragments thereof.

Description of the Related Art

Adoptive cellular therapy is emerging as a powerful paradigm for delivering complex biological signals to treat cancer. Immune effector cells can be modified to express receptors and redirected to target cancer cells. However, compositions and methods for detecting and/or monitoring these therapeutic cells are not routinely available.

BRIEF SUMMARY

The invention generally provides improved antibodies and antigen binding fragments thereof that bind to FK506-binding protein (FKBP) rapamycin binding (FRB) polypeptides. In particular embodiments, the antibodies and antigen binding fragments bind an FRB domain present in a dimerizing agent regulated immunoreceptor complex (DARIC) or other chimeric protein.

In particular embodiments, an anti-FKBP Rapamycin binding (FRB) antibody or antigen binding fragment thereof that binds an FRB polypeptide comprises a light chain variable region comprising the light chain CDRs (CDRL1-CDRL3) set forth in any one of SEQ ID NOs: 1-3, 11-13, 21-23, 31-33, and 41-43 and a heavy chain variable region comprising the heavy chain CDRs (CDRH1-CDRH3) set forth in any one of SEQ ID NOs: 4-6, 14-16, 24-26, 34-36, and 44-46.

In some embodiments, the antibody or antigen binding fragment thereof comprises a light chain variable region comprising the light chain CDRs (CDRL1-CDRL3) set forth in SEQ ID NOs: 1-3 and the heavy chain variable region comprising the heavy chain CDRs (CDRH1-CDRH3) set forth in SEQ ID NOs: 4-6.

In particular embodiments, the antibody or antigen binding fragment thereof comprises a light chain variable region comprising the light chain CDRs (CDRL1-CDRL3) set forth in SEQ ID NOs: 11-13 and the heavy chain variable region comprising the heavy chain CDRs (CDRH1-CDRH3) set forth in SEQ ID NOs: 14-16.

In certain embodiments, the antibody or antigen binding fragment thereof comprises a light chain variable region comprising the light chain CDRs (CDRL1-CDRL3) set forth in SEQ ID NOs: 21-23 and the heavy chain variable region comprising the heavy chain CDRs (CDRH1-CDRH3) set forth in SEQ ID NOs: 24-26.

In some embodiments, the antibody or antigen binding fragment thereof comprises a light chain variable region comprising the light chain CDRs (CDRL1-CDRL3) set forth in SEQ ID NOs: 31-33 and the heavy chain variable region comprising the heavy chain CDRs (CDRH1-CDRH3) set forth in SEQ ID NOs: 34-36.

In particular embodiments, the antibody or antigen binding fragment thereof comprises a light chain variable region comprising the light chain CDRs (CDRL1-CDRL3) set forth in SEQ ID NOs: 41-43 and the heavy chain variable region comprising the heavy chain CDRs (CDRH1-CDRH3) set forth in SEQ ID NOs: 44-46.

In some embodiments, the antibody or antigen binding fragment thereof comprises a variable light chain sequence as set forth in any one of SEQ ID NOs: 7, 9, 17, 19, 27, 29, 37, 39, 47, and 49 and a variable heavy chain sequence as set forth in any one of SEQ ID NOs: 8, 10, 18, 20, 28, 30, 38, 40, 48, and 50.

In certain embodiments, the antibody or antigen binding fragment thereof comprises a variable light chain sequence as set forth in SEQ ID NO: 7 and a variable heavy chain sequence as set forth in SEQ ID NO: 8.

In certain embodiments, the antibody or antigen binding fragment thereof comprises a variable light chain sequence as set forth in SEQ ID NO: 9 and a variable heavy chain sequence as set forth in SEQ ID NO: 10.

In particular embodiments, the antibody or antigen binding fragment thereof comprises a variable light chain sequence as set forth in SEQ ID NO: 17 and a variable heavy chain sequence as set forth in SEQ ID NO: 18.

In particular embodiments, the antibody or antigen binding fragment thereof comprises a variable light chain sequence as set forth in SEQ ID NO: 19 and a variable heavy chain sequence as set forth in SEQ ID NO: 20.

In some embodiments, the antibody or antigen binding fragment thereof comprises a variable light chain sequence as set forth in SEQ ID NO: 27 and a variable heavy chain sequence as set forth in SEQ ID NO: 28.

In some embodiments, the antibody or antigen binding fragment thereof comprises a variable light chain sequence as set forth in SEQ ID NO: 29 and a variable heavy chain sequence as set forth in SEQ ID NO: 30.

In particular embodiments, the antibody or antigen binding fragment thereof comprises a variable light chain sequence as set forth in SEQ ID NO: 37 and a variable heavy chain sequence as set forth in SEQ ID NO: 38.

In some embodiments, the antibody or antigen binding fragment thereof comprises a variable light chain sequence as set forth in SEQ ID NO: 39 and a variable heavy chain sequence as set forth in SEQ ID NO: 40.

In particular embodiments, the antibody or antigen binding fragment thereof comprises a variable light chain sequence as set forth in SEQ ID NO: 47 and a variable heavy chain sequence as set forth in SEQ ID NO: 48.

In particular embodiments, the antibody or antigen binding fragment thereof comprises a variable light chain sequence as set forth in SEQ ID NO: 49 and a variable heavy chain sequence as set forth in SEQ ID NO: 50.

In some embodiments, the preceding claims, wherein the antibody or antigen binding fragment comprises a variable heavy chain sequence, a polypeptide linker, and a variable light chain sequence.

In particular embodiments, the preceding claims, wherein the antibody or antigen binding fragment comprises a variable light chain sequence, a polypeptide linker, and a variable heavy chain sequence.

In some embodiments, the preceding claims, wherein the antibody or antigen binding fragment is a monoclonal antibody or antigen binding fragment.

In particular embodiments, the preceding claims, wherein the antibody or antigen binding fragment is a single chain variable fragment (scFv).

In particular embodiments, a conjugate comprises the anti-FRB antibody or antigen binding fragment thereof of any of the preceding claims and a detectable label.

In certain embodiments, the detectable label is selected from the group consisting of: a hapten, a fluorescent dye, a fluorescent protein, a chromophore, a metal ion, a gold particle, a silver particle, a magnetic particle, a polypeptide, an enzyme, a luminescent compound, or an oligonucleotide.

In particular embodiments, the detectable label is a fluorescent dye selected from the group consisting of: Oregon Green®, Pacific Blue™, Pacific Orange™, Pacific Green™, Cascade Blue™, Cascade Yellow™, Lucifer Yellow™, Marina Blue™, and Texas Red® (TxRed).

In certain embodiments, the detectable label is an AlexaFluor® (AF) dye selected from the group consisting of: AF350, AF405, AF488, AF500, AF514, AF532, AF546, AF555, AF568, AF594, AF610, AF633, AF635, AF647, AF680, AF700, AF710, AF750, AF790, and AF800.

In some embodiments, the detectable label is a QDot® selected from the group consisting of: Qdot®525, Qdot®565, Qdot®585, Qdot®605, Qdot®655, Qdot®705, and Qdot®800.

In particular embodiments, the detectable label is a DyLight™ Dye (DL) selected from the group consisting of: DL549, DL649, DL680, and DL800.

In certain embodiments, the detectable label is a hapten selected from the group consisting of: fluorescein or a derivative thereof, fluorescein isothiocyanate, carboxyfluorescein, dichlorotriazinylamine fluorescein, digoxigenin, dinitrophenol (DNP), trinitrophenol (TNP), and biotin.

In particular embodiments, the detectable label is a Cy Dye selected from the group consisting of: Cy2, Cy3, Cy3.5, Cy5, Cy5.5, Cy7, and Cy 7.5.

In some embodiments, the detectable label is a fluorescent molecule selected from the group consisting of: Phycoerythrin (PE, R-Phycoerythrin (RPE)), B-Phycoerythrin (BPE), Peridinin Chlorophyll (PerCP), Allophycocyanin (APC), and C-Phycocyanin.

In particular embodiments, the detectable label is a fluorescent dye selected from the group consisting of: Atto 390, Atto 425, Atto 465, Atto 488, Atto 495, Atto 514Atto 520, Atto 532, Atto 550, Atto 565, Atto 590, Atto 594, Atto 610, Atto 620, Atto 633, Atto 647, Atto 655, Atto 665, Atto 680, Atto 700, Atto 725, Atto 740, Super Bright™ 436, Super Bright™ 600, Super Bright™ 645, Super Bright™ 702, Super Bright™ 780, Brilliant™ Violet 421, Brilliant™ Violet 480, Brilliant™ Violet 510, Brilliant™ Violet 605, Brilliant Violet™ 650, Brilliant Violet™ 711, Brilliant Violet™ 786, Brilliant™ Ultraviolet 395 (BUV395), Brilliant™ Ultraviolet 496 (BUV496), Brilliant™ Ultraviolet 563 (BUV563), Brilliant™ Ultraviolet 661 (BUV661), Brilliant™ Ultraviolet 737 (BUV737), Brilliant™ Ultraviolet 805 (BUV805), Brilliant™ Blue 515 (BB515), Brilliant™ Blue 700 (BB700) and IR Dye 680, IR Dye 680LT, IR Dye 700, IR Dye 700DX, IR Dye 800, IR Dye 800RS, and IR Dye 800CW.

In certain embodiments, the detectable label is a tandem fluorescent dye selected from the group consisting of: RPE-Cy5, RPE-Cy5.5, RPE-Cy7, RPE-CF594, RPE-AlexaFluor® tandem conjugates; RPE-Alexa610, RPE-TxRed, APC-H7, APC-R700, APC-Alexa600, APC-Alexa610, APC-Alexa750, APC-Cy5, APC-Cy5.5, and APC-Cy7.

In certain embodiments, the detectable label is a fluorescent protein selected from the group consisting of: GFP, eGFP, BFP, CFP, YFP, DsRed, DsRed2, mRFP, mBanana, mOrange, dTomato, tdTomato, mTangerine, mStrawberry, mCherry, mPlum, and mRaspberry.

In particular embodiments, the detectable label is an enzyme selected from the group consisting of: alkaline phosphatase, horseradish peroxidase, luciferase, and θ-galactosidase.

In certain embodiments, the detectable label comprises a radionuclide selected from the group consisting of: carbon (14C), chromium (51Cr), cobalt (57Co), fluorine (18F), gadolinium (153Gd, 159Gd), germanium (68Ge), holmium (166Ho), indium (115In, 113In, 112In, mIn), iodine (125I, 123I, 121I), lanthanium (140La), lutetium (177Lu), manganese (54Mn), molybdenum (99 Mo), palladium (103 Pd), phosphorous (32P), praseodymium (142 Pr), promethium (149Pm), rhenium (186Re, 188Re), rhodium (105Rh), rutheroium (97Ru), samarium (153Sm), scandium (47Sc), selenium (75Se), (85Sr), sulphur (35S), technetium (99Tc), thallium (201Ti), tin (113Sn, 117Sn), tritium (3H), xenon (133Xe), ytterbium (169Yb, 175Yb), and yttrium (90Y).

In particular embodiments, the anti-FRB antibody or antigen binding fragment binds an FRB polypeptide sequence set forth in SEQ ID NO: 51.

In particular embodiments, a polynucleotide encodes the anti-FRB antibody or antigen binding fragment thereof contemplated herein.

In particular embodiments, a composition comprises an anti-FRB antibody or antigen binding fragment, a conjugate, or a polynucleotide contemplated herein.

In particular embodiments, a hybridoma comprises polynucleotides encoding anti-FRB antibody or antigen binding fragment thereof contemplated herein.

In particular embodiments, a hybridoma comprising an antibody contemplated herein is provided.

BRIEF DESCRIPTION OF THE SEQUENCE IDENTIFIERS

Figure 1:
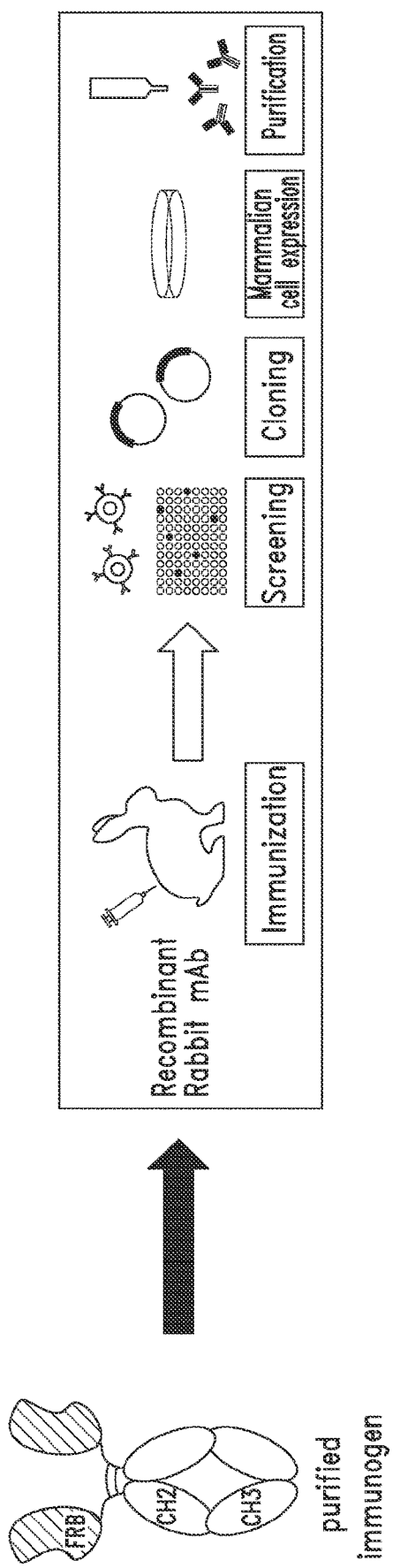
FIG. 1 shows a schematic of an antibody production process.
Figure 2A:
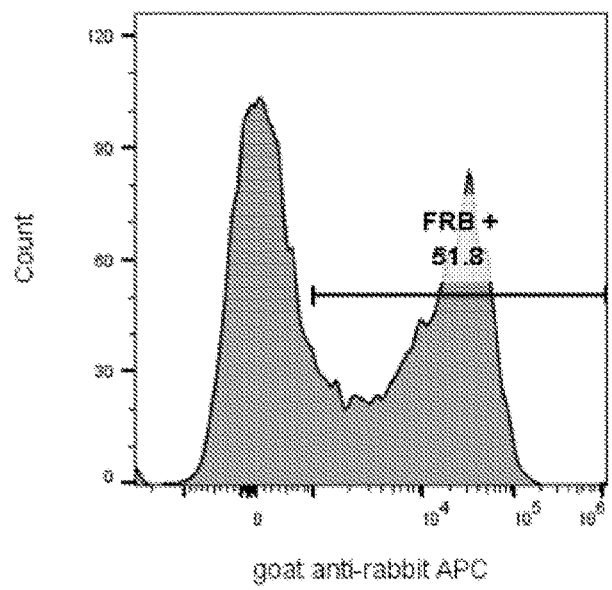
FIGS. 2A-2E show antibody binding data for anti-FRB antibody clones against cells expressing a protein comprising an extracellular FRB domain.
Figure 2A:
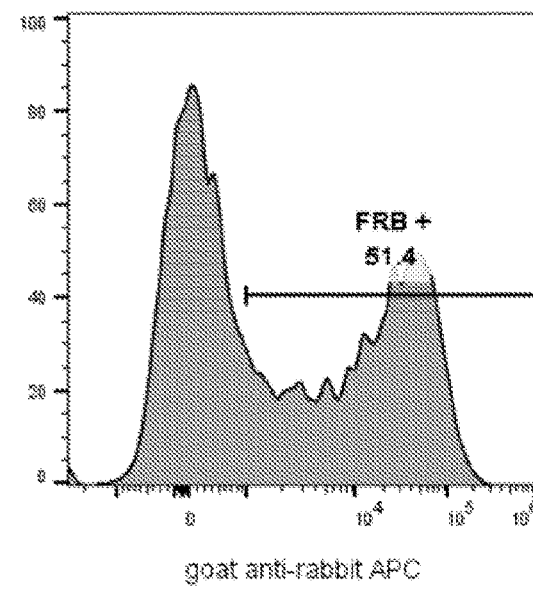
Figure 2A:
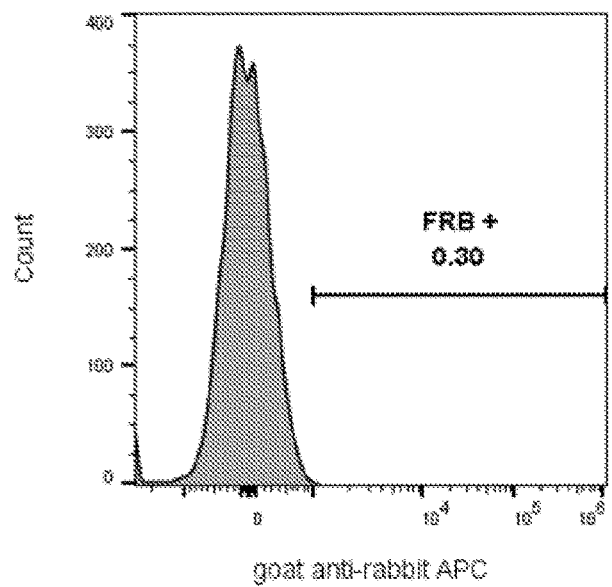
Figure 2A:
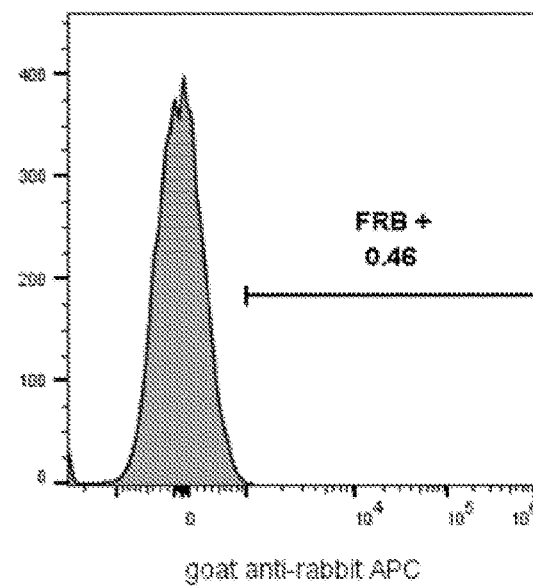
Figure 2A:
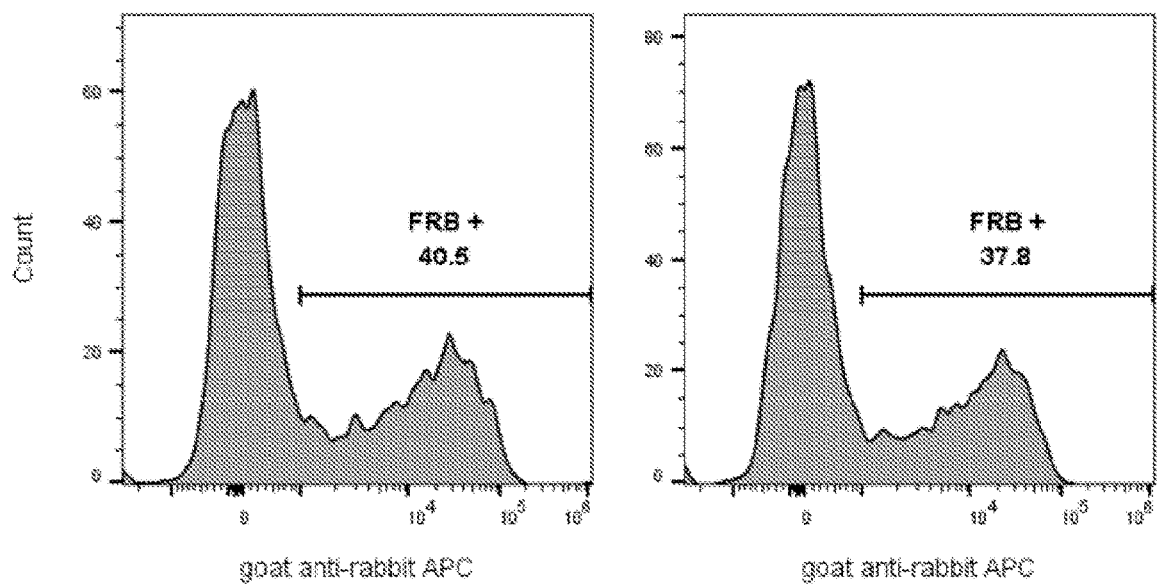
Figure 2A:
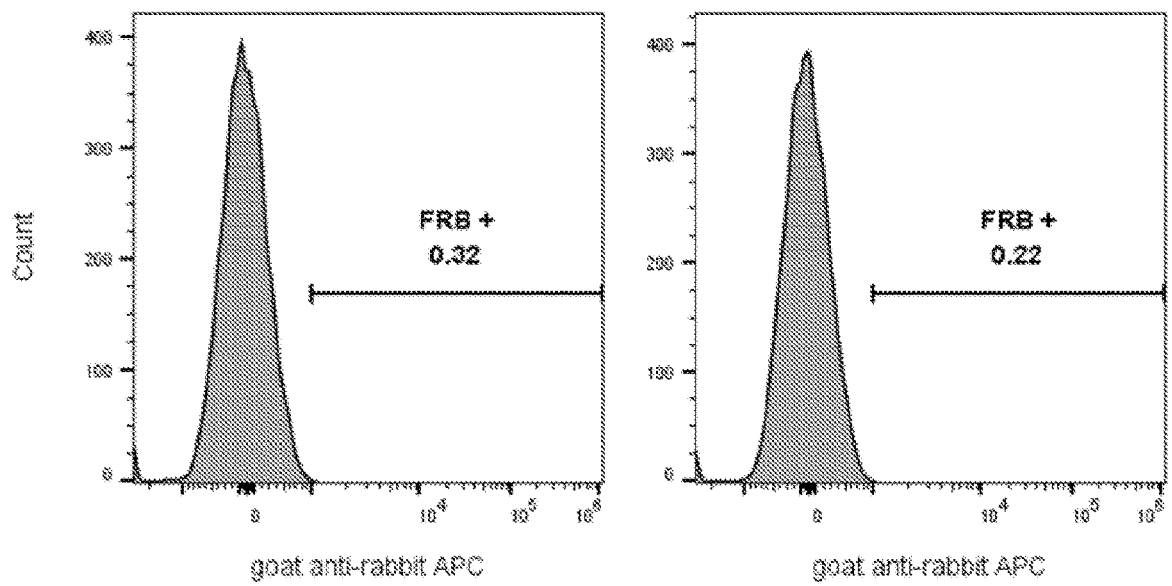
Figure 2A:
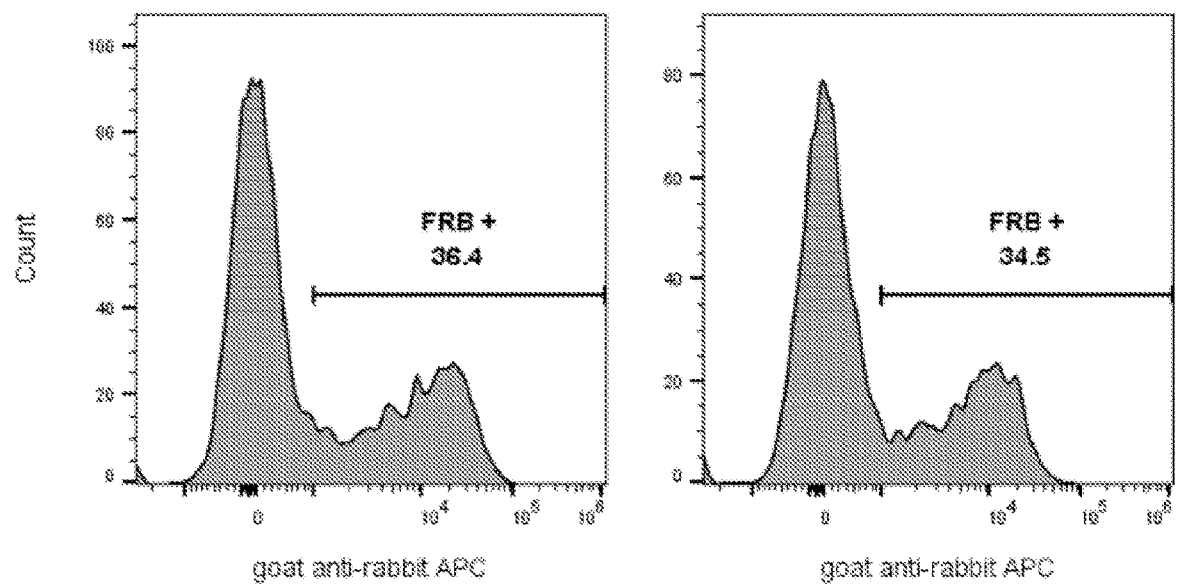
Figure 2A:
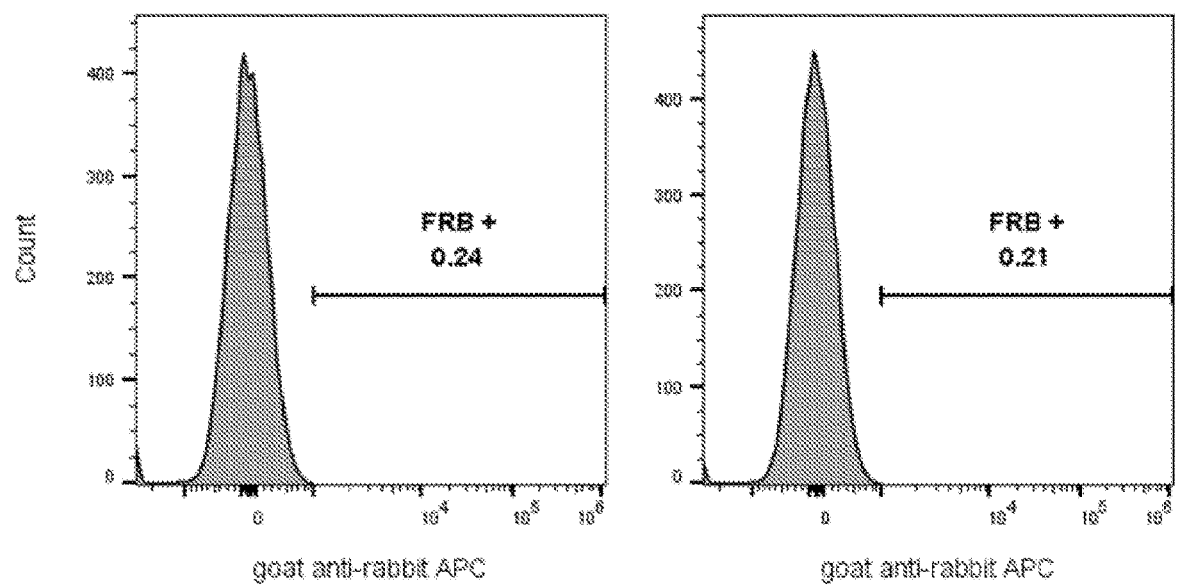
Figure 2B:
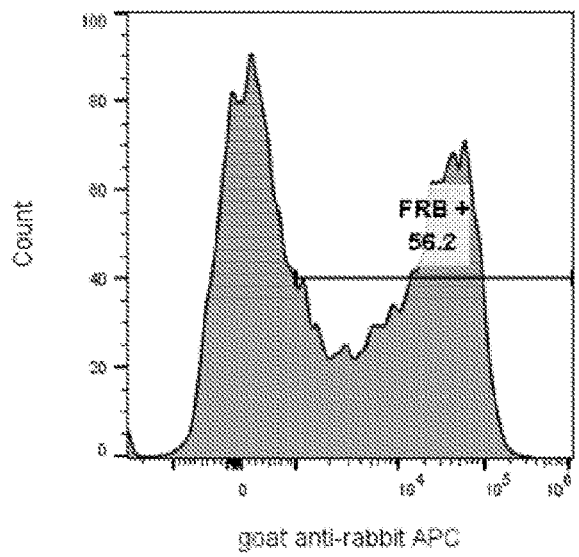
Figure 2B:
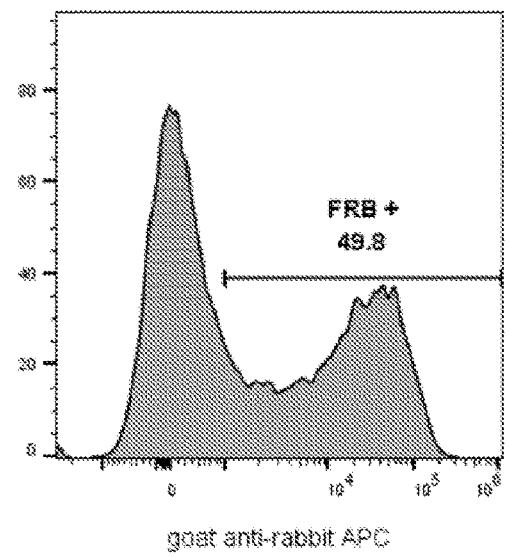
Figure 2B:
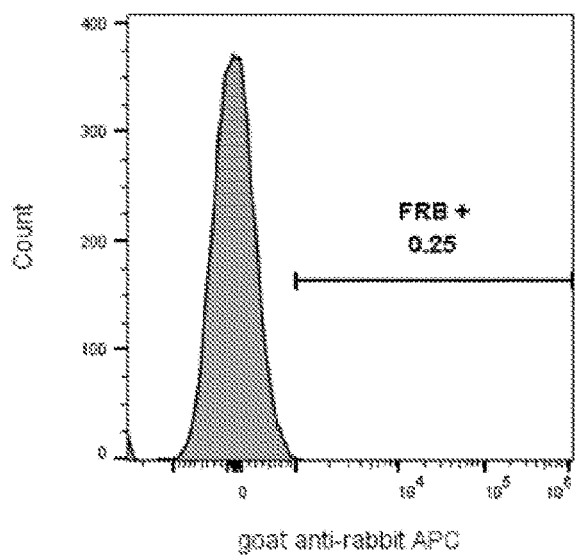
Figure 2B:
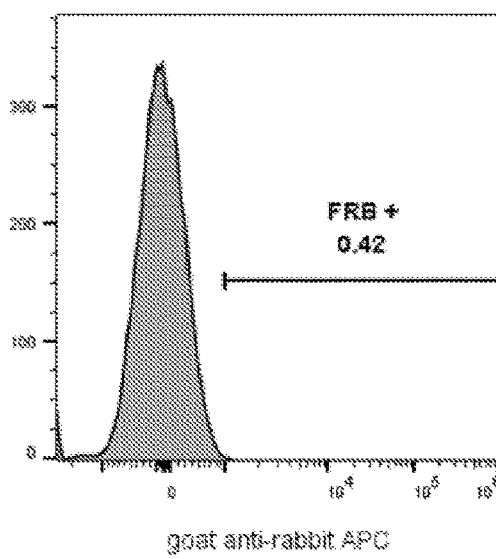
Figure 2B:
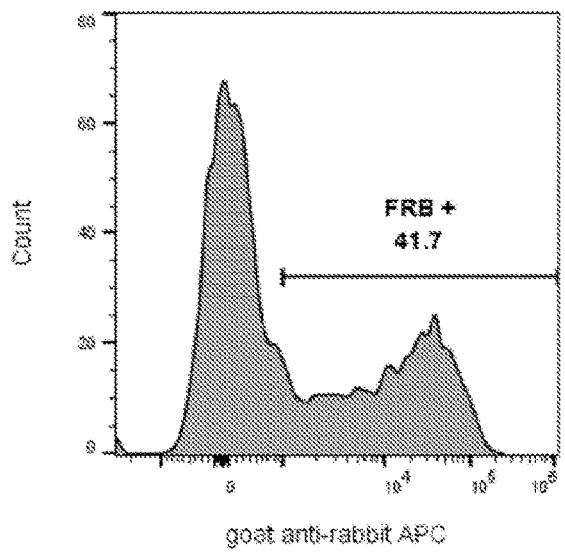
Figure 2B:
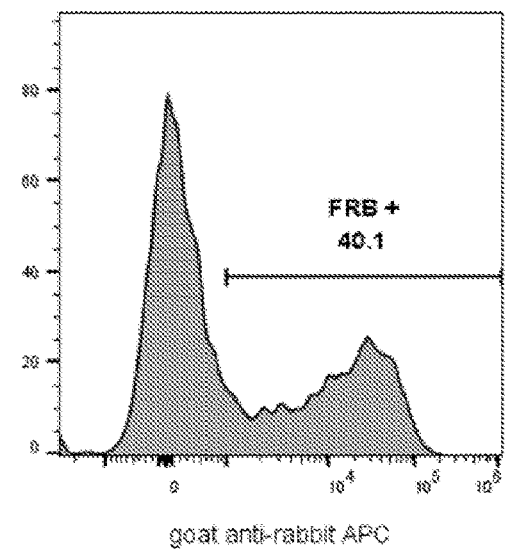
Figure 2B:
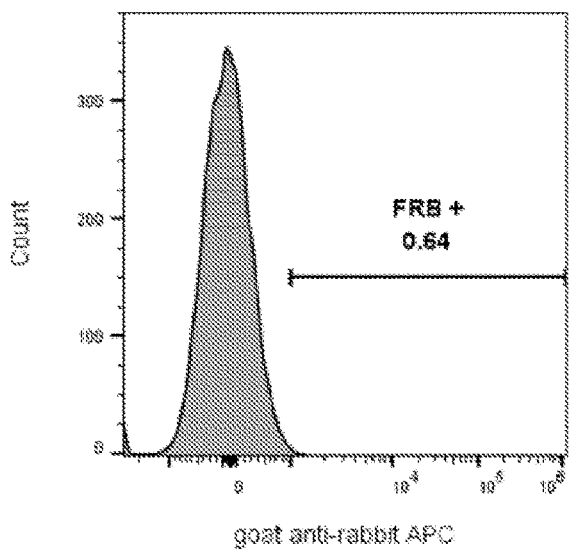
Figure 2B:
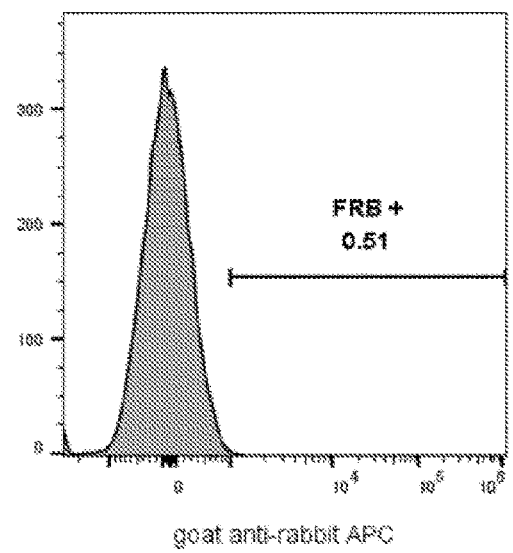
Figure 2B:
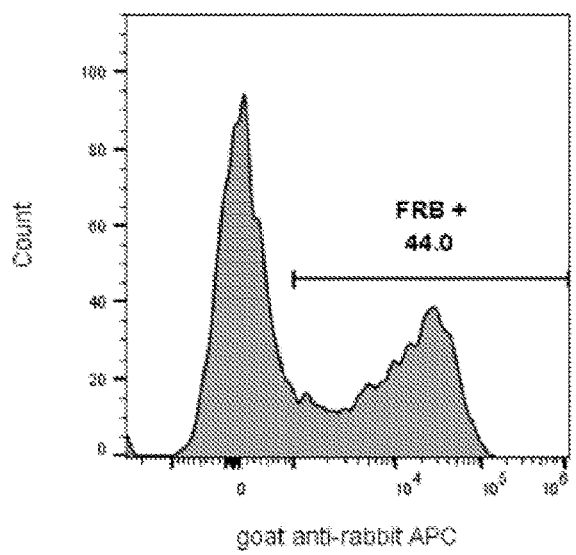
Figure 2B:
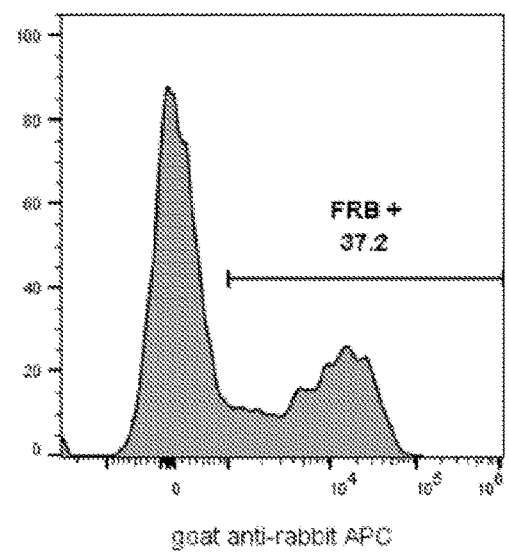
Figure 2B:
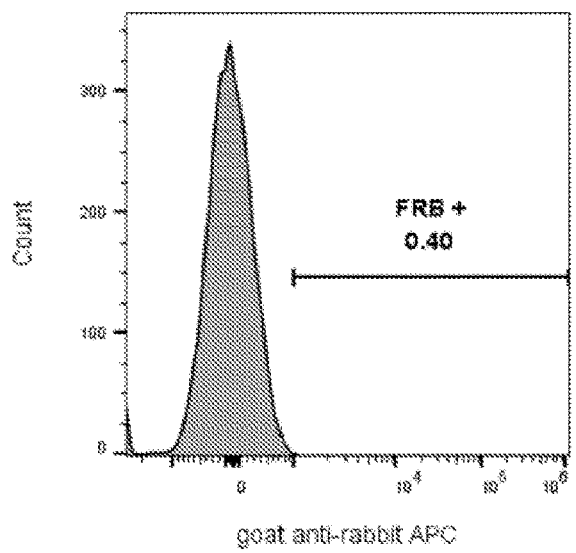
Figure 2B:
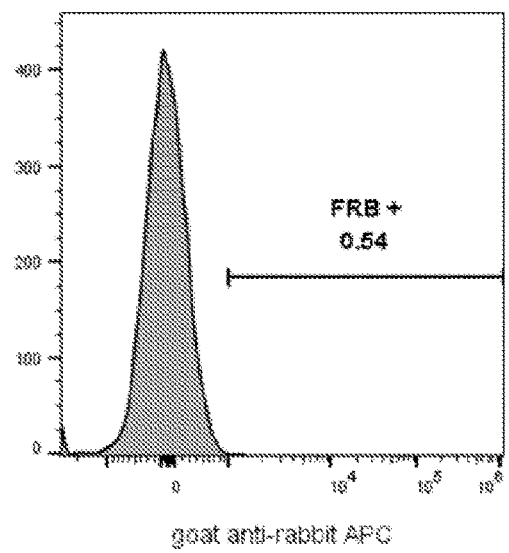
Figure 2C:
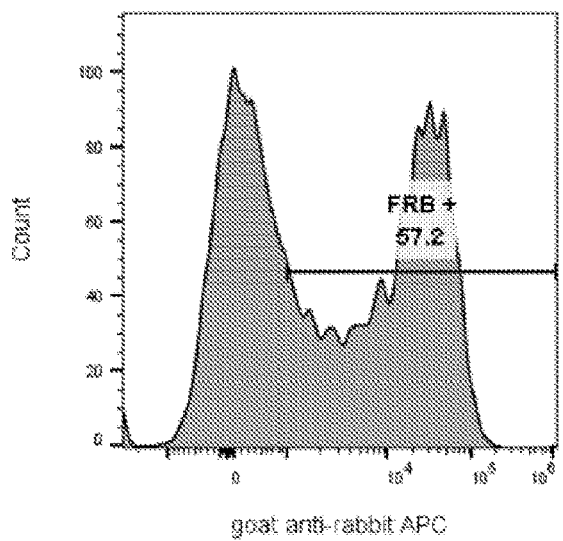
Figure 2C:
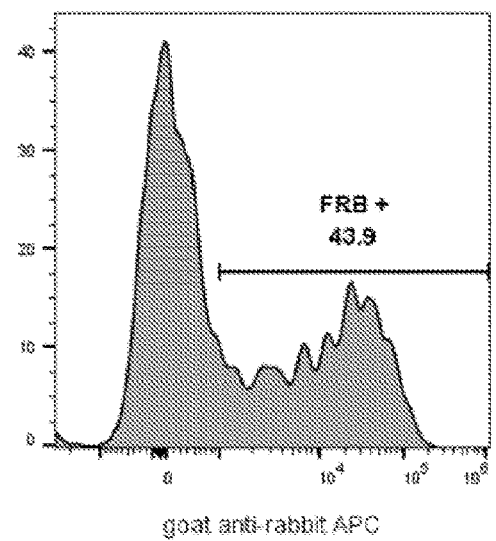
Figure 2C:
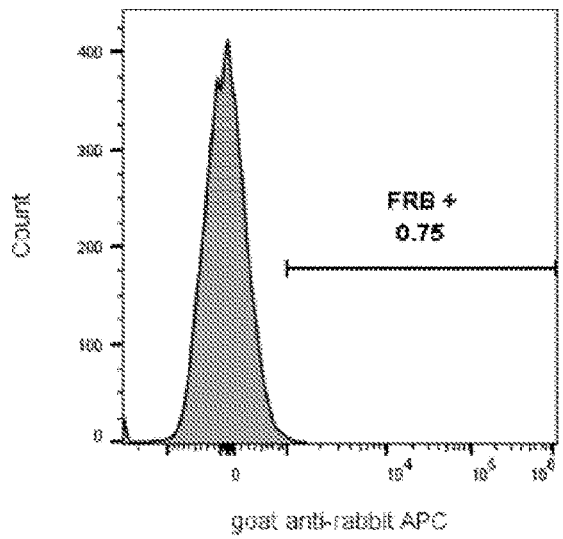
Figure 2C:
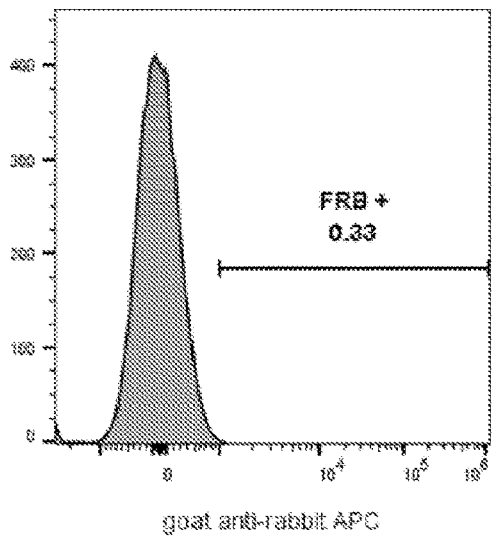
Figure 2C:
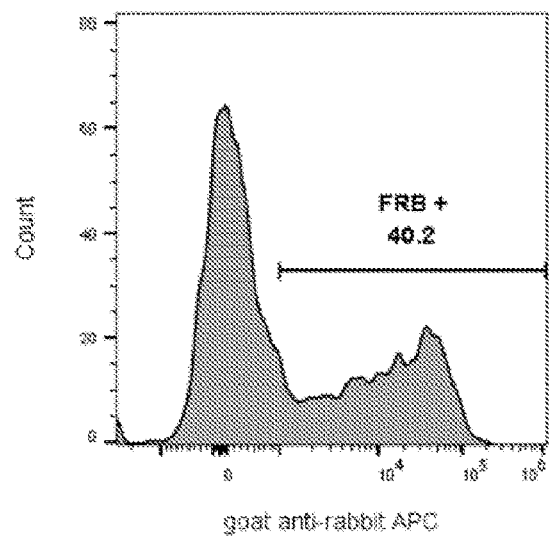
Figure 2C:
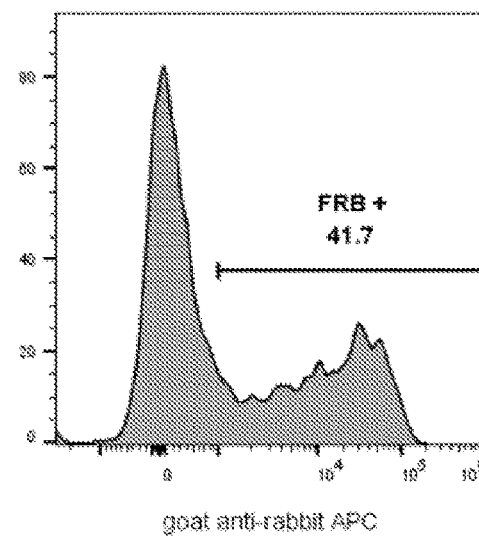
Figure 2C:
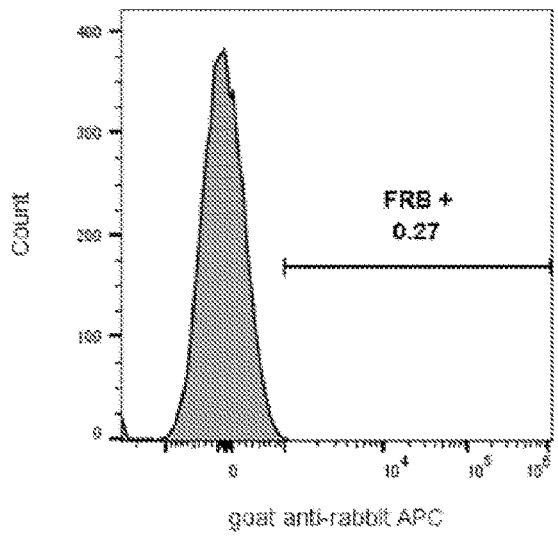
Figure 2C:
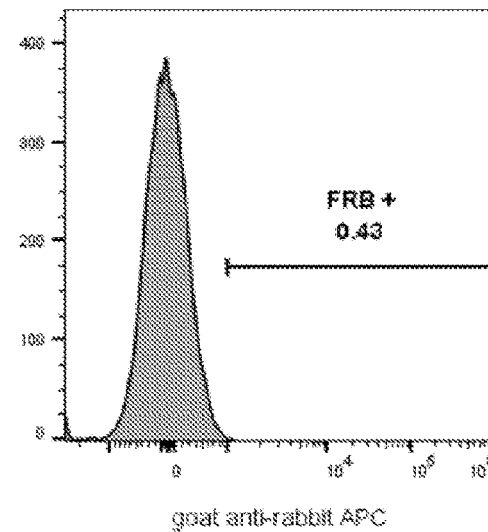
Figure 2C:
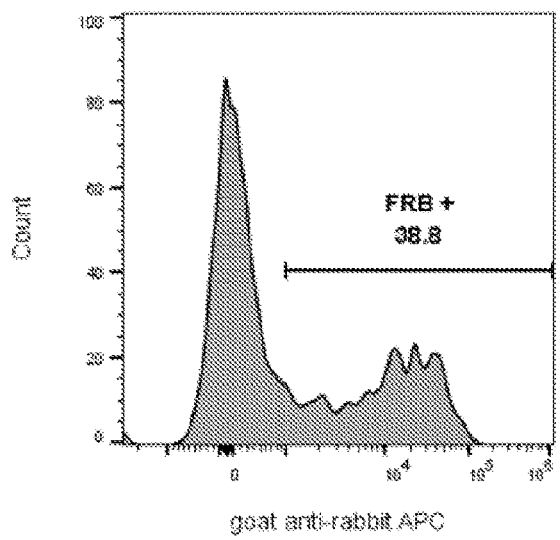
Figure 2C:
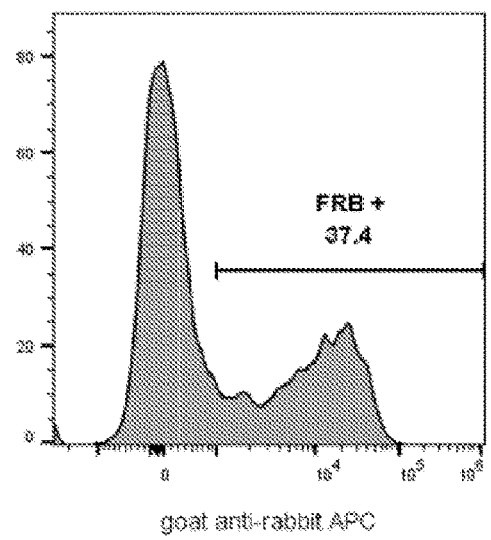
Figure 2C:
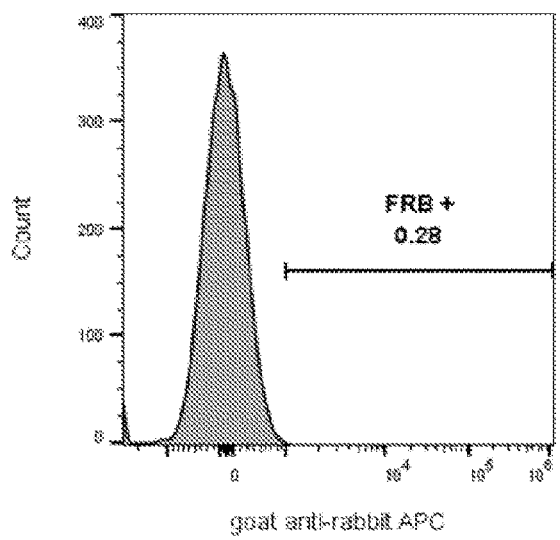
Figure 2C:
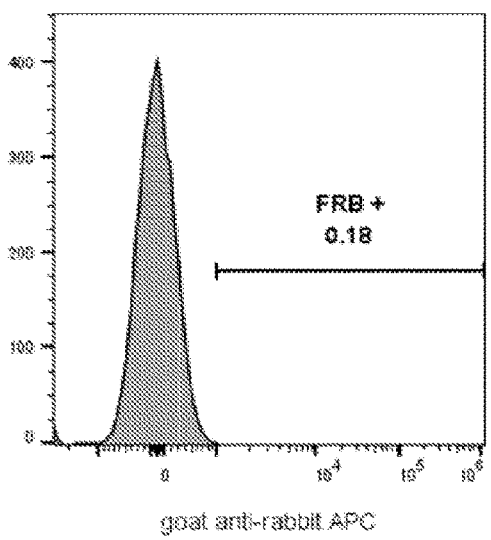
Figure 2D:
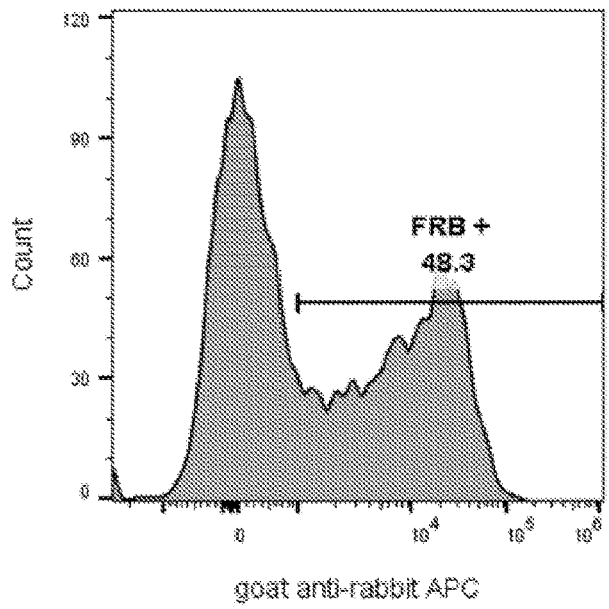
Figure 2D:
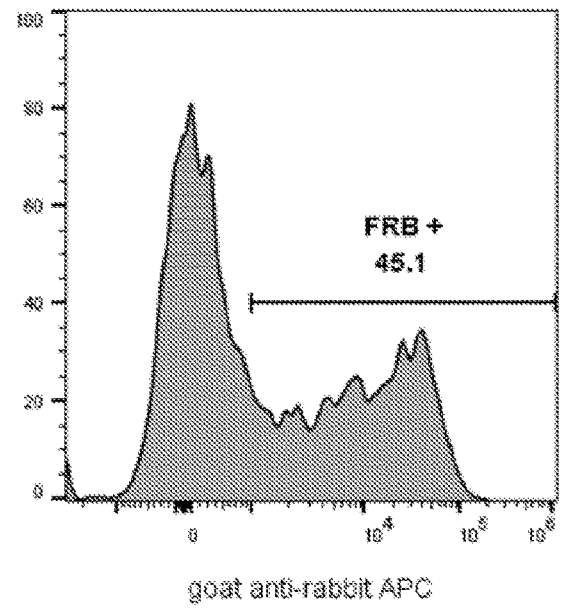
Figure 2D:
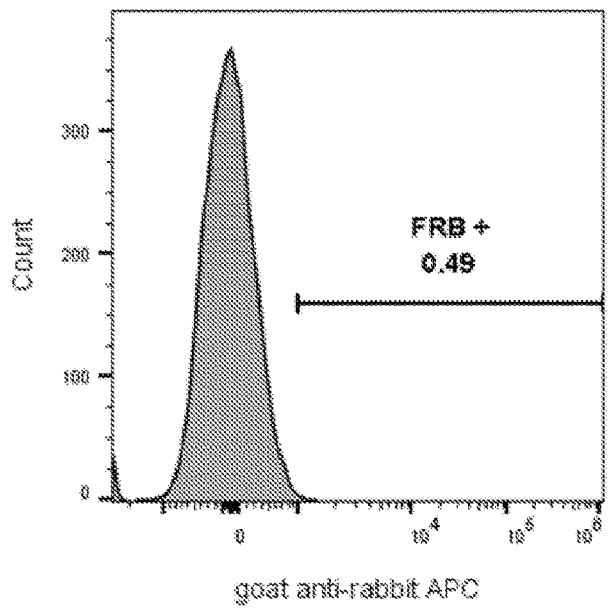
Figure 2D:
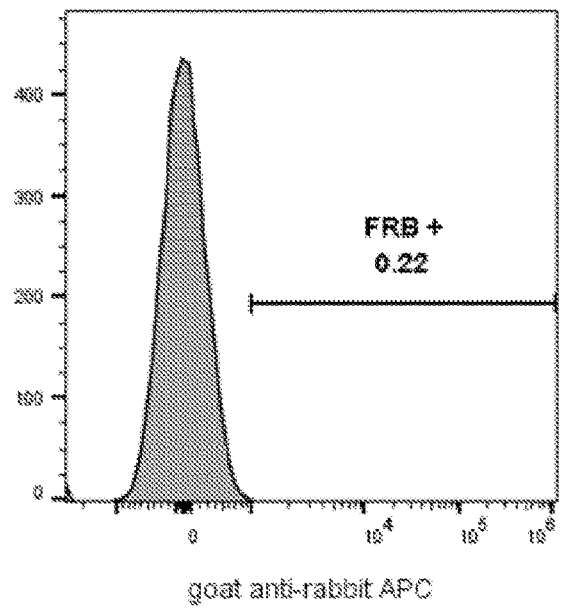
Figure 2D:
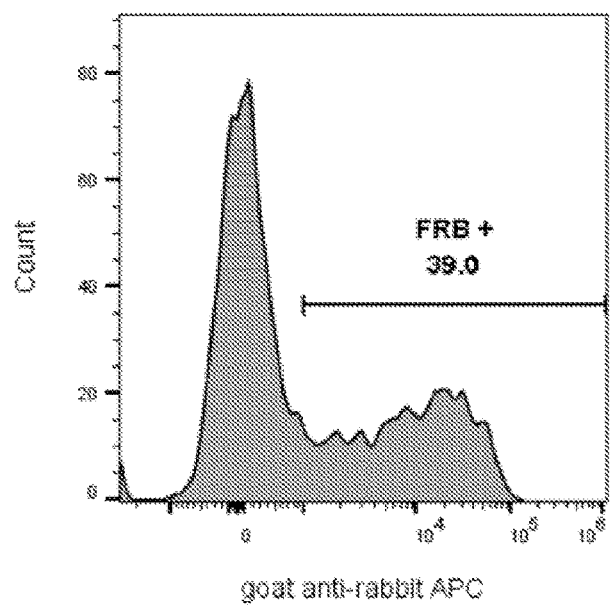
Figure 2D:
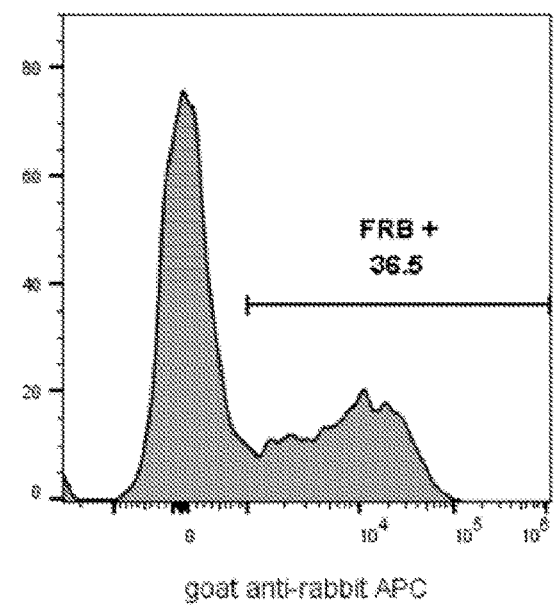
Figure 2D:
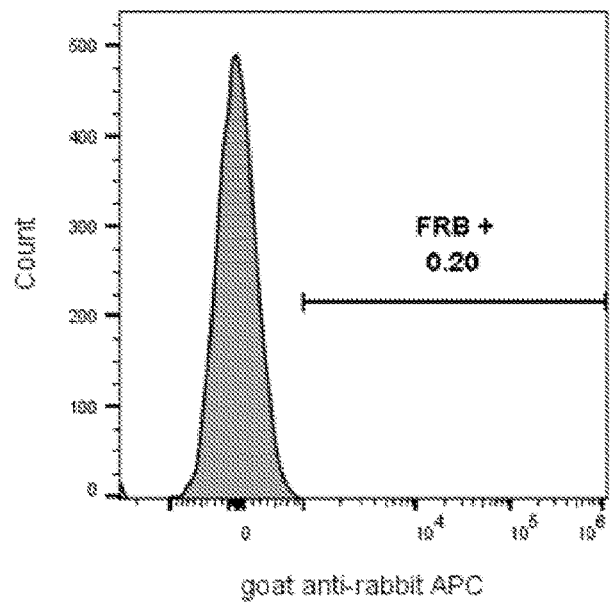
Figure 2D:
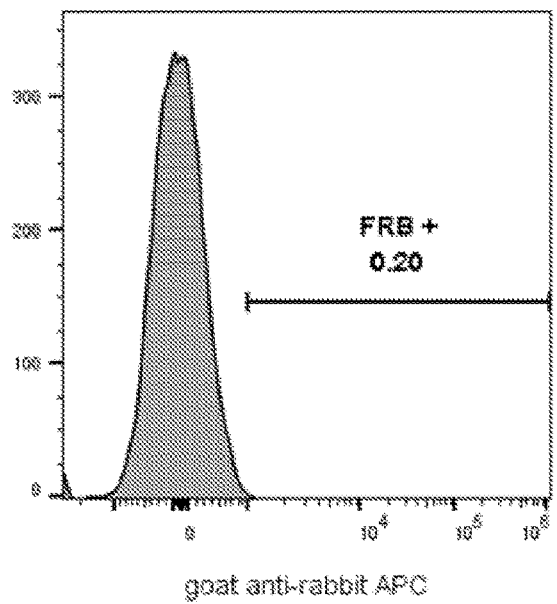
Figure 2D:
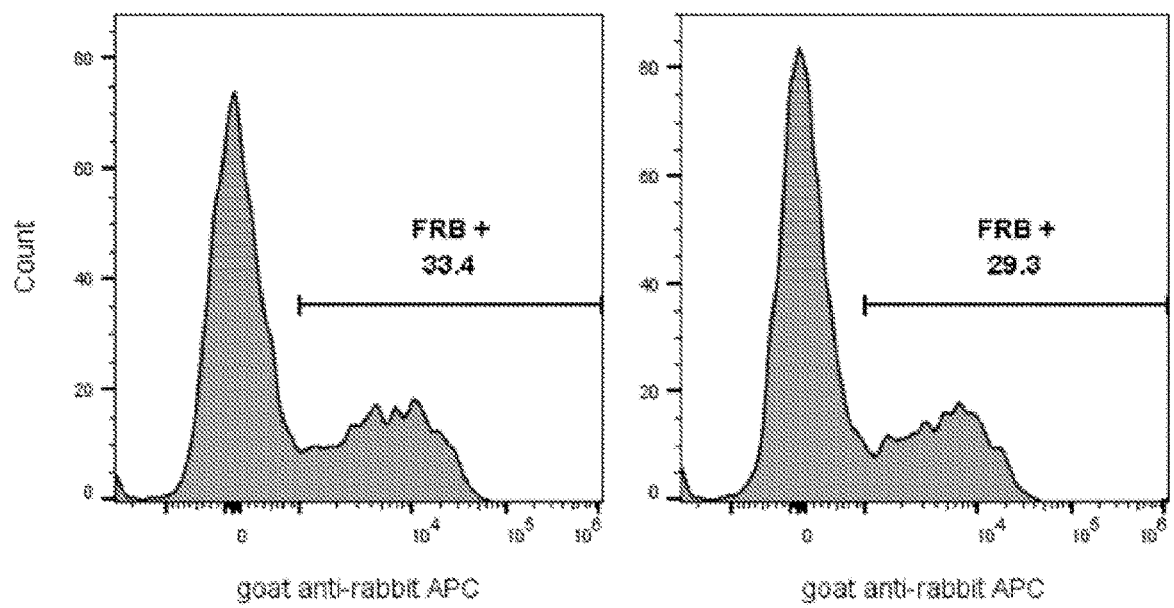
Figure 2D:
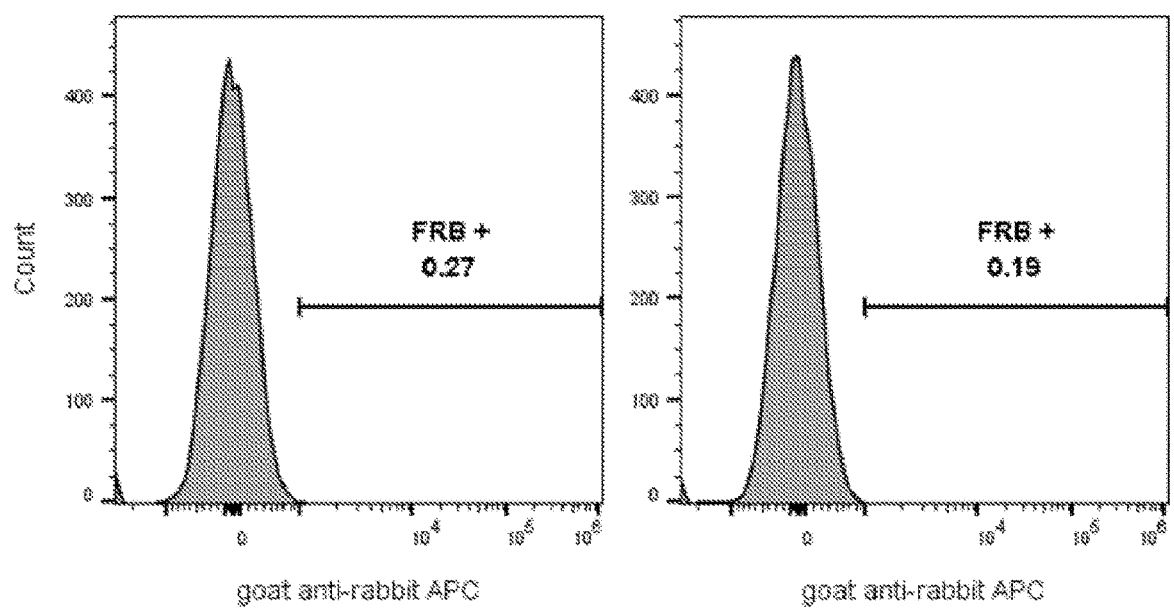
Figure 2E:
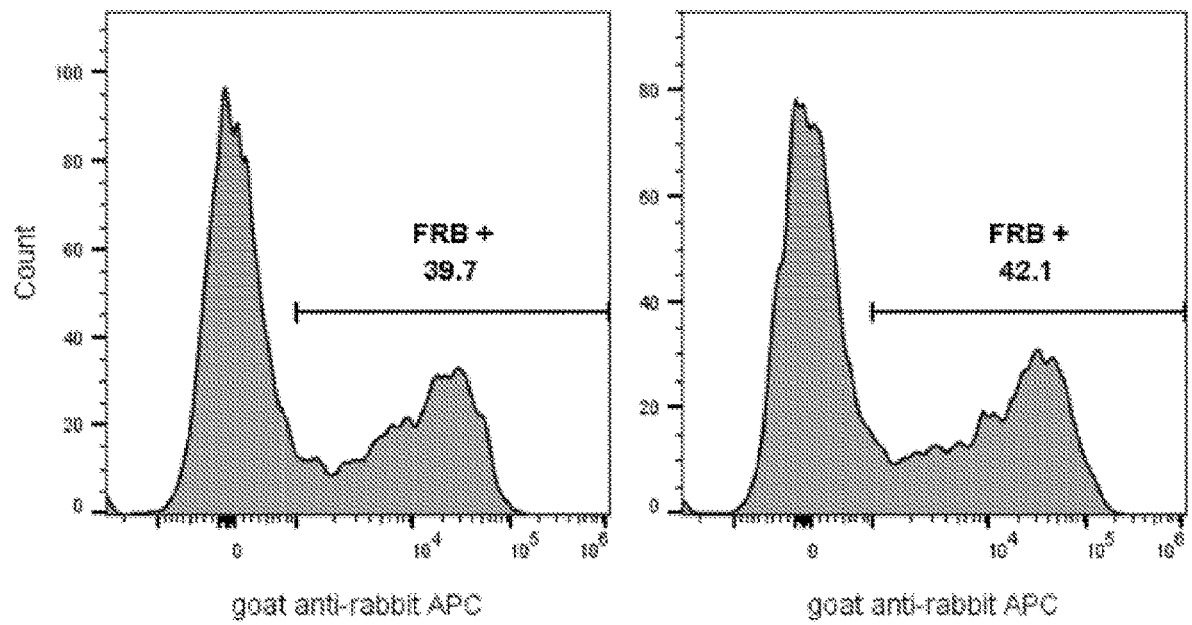
Figure 2E:
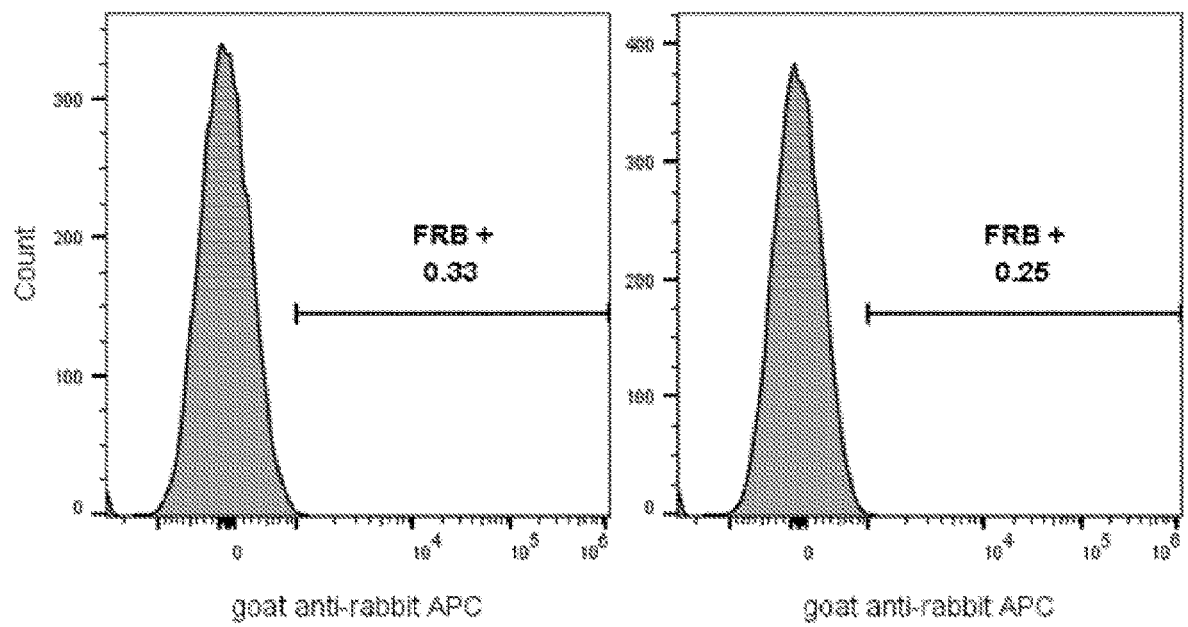
Figure 2E:
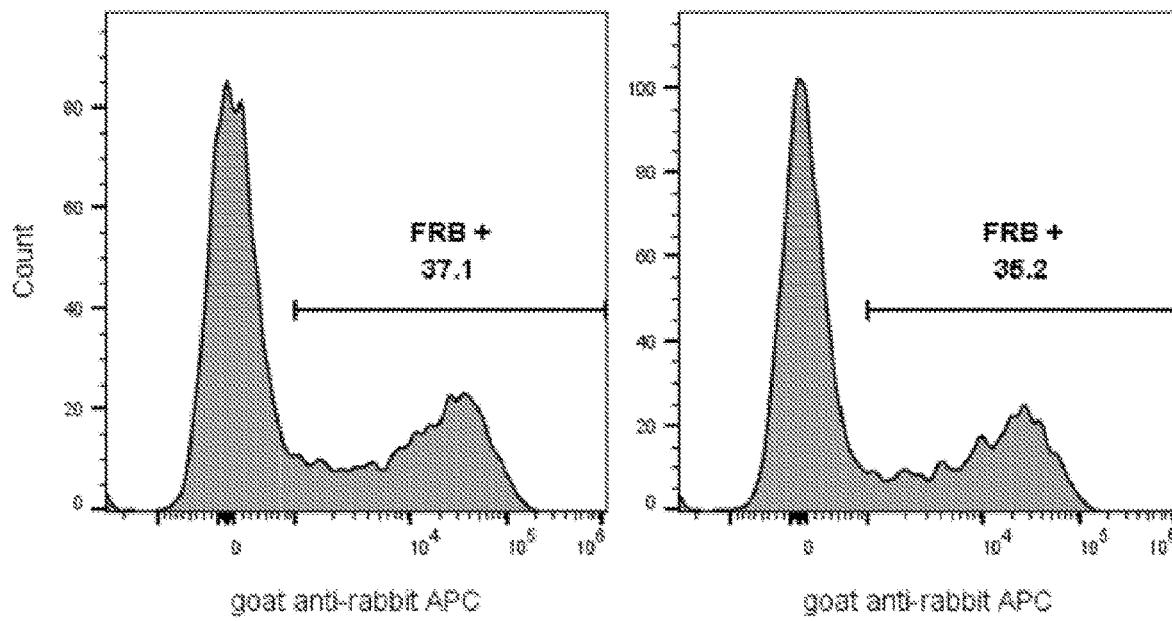
Figure 2E:
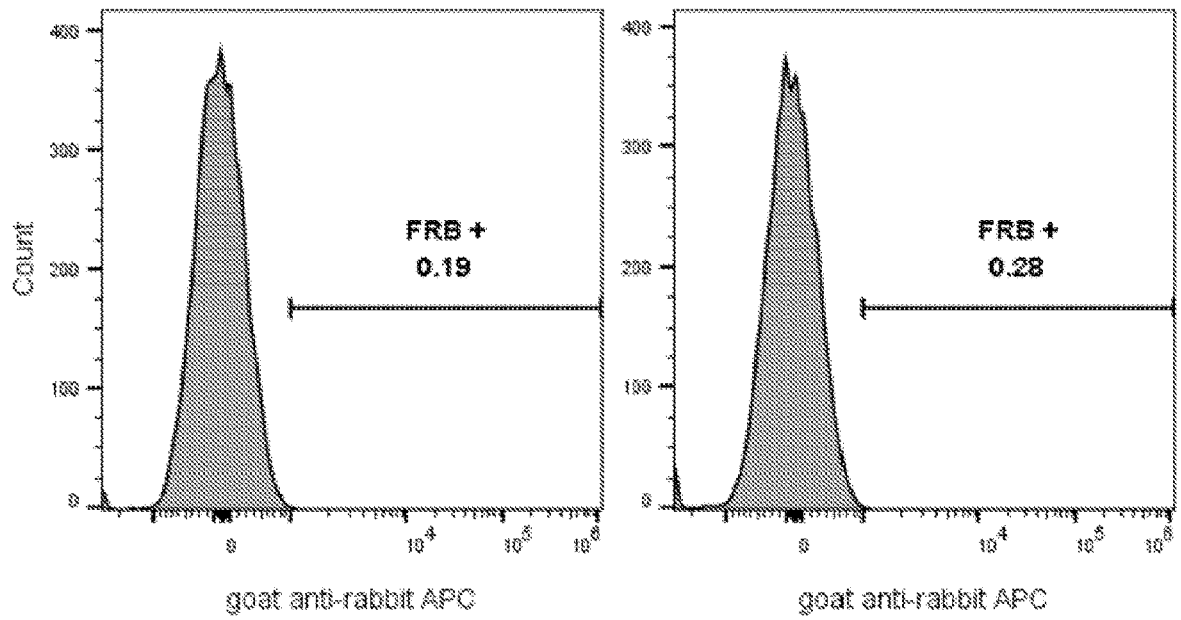
Figure 2E:
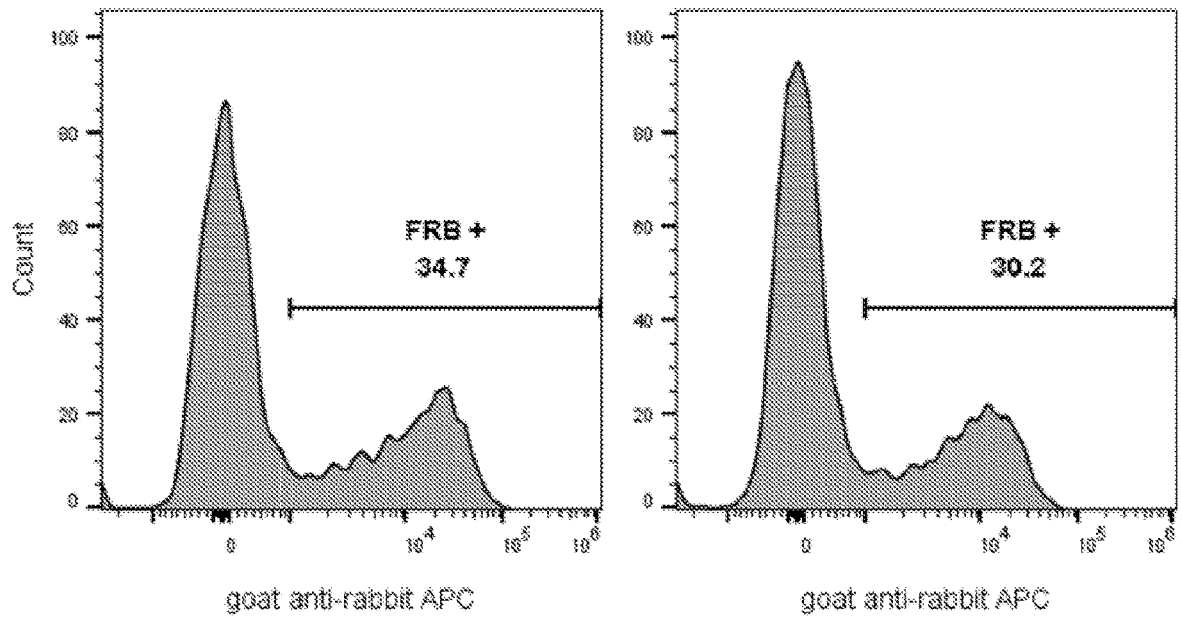
Figure 2E:
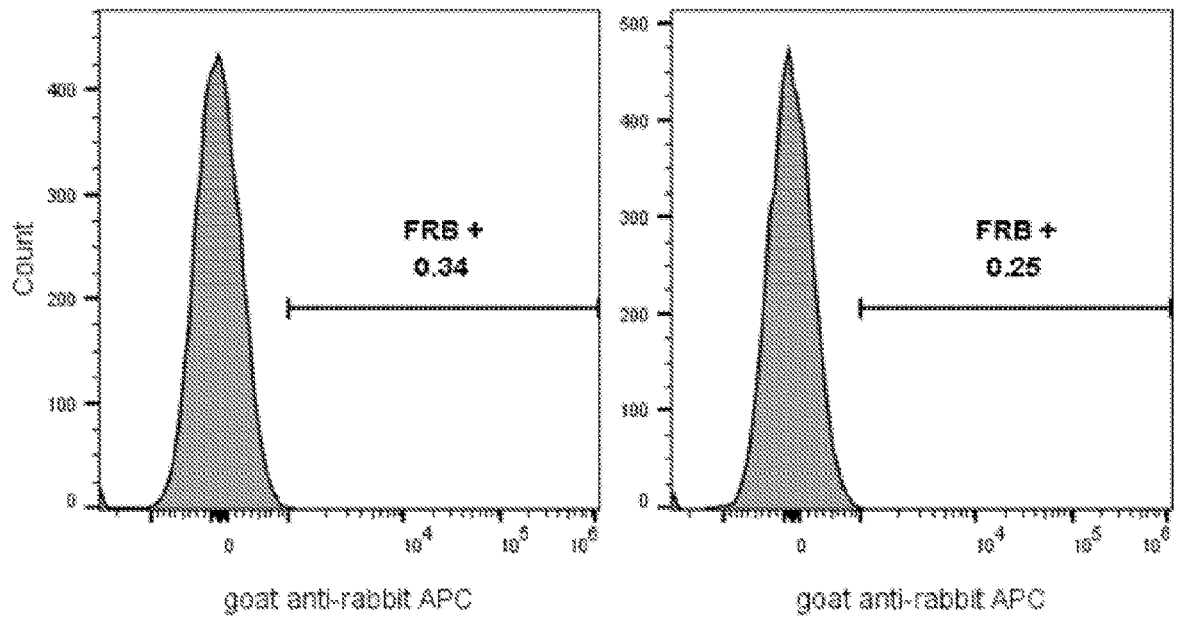

SEQ ID NOs: 1-3, 11-13, 21-23, 31-33, and 41-43 set forth exemplary amino acid sequences of light chain CDR1-3 sequences.

SEQ ID NOs: 4-6, 14-16, 24-26, 34-36, and 44-46 set forth exemplary amino acid sequences of heavy chain CDR1-3 sequences.

SEQ ID NO: 7, 9, 17, 19, 27, 29, 37, 39, 47, and 49 sets forth exemplary variable domain light chains.

SEQ ID NO: 8, 10, 18, 20, 28, 30, 38, 40, 48, and 50 sets forth an exemplary variable domain heavy chain.

SEQ ID NO: 51 sets forth an FRB amino acid sequence.

SEQ ID NOs: 52-61 set forth the amino acid sequences of various linkers.

DETAILED DESCRIPTION

A. Overview

The invention generally relates to improved anti-FRB antibodies and antigen binding fragments thereof, compositions, and diagnostic uses of the same.

Techniques for recombinant (i.e., engineered) DNA, peptide and oligonucleotide synthesis, immunoassays, tissue culture, transformation (e.g., electroporation, lipofection), enzymatic reactions, purification and related techniques and procedures may be generally performed as described in various general and more specific references in microbiology, molecular biology, biochemistry, molecular genetics, cell biology, virology and immunology as cited and discussed throughout the present specification. See, e.g., Sambrook et al., *Molecular Cloning: A Laboratory Manual,* 3d ed., Cold Spring Harbor Laboratory Press, Cold Spring Harbor, N.Y.; *Current Protocols in Molecular Biology* (John Wiley and Sons, updated July 2008); *Short Protocols in Molecular Biology: A Compendium of Methods from Current Protocols in Molecular Biology*, Greene Pub. Associates and Wiley-Interscience; Glover, *DNA Cloning: A Practical Approach*, vol. I & II (IRL Press, Oxford Univ. Press USA, 1985); *Current Protocols in Immunology* (Edited by: John E. Coligan, Ada M. Kruisbeek, David H. Margulies, Ethan M. Shevach, Warren Strober 2001 John Wiley & Sons, NY, N.Y.); *Real-Time PCR: Current Technology and Applications*, Edited by Julie Logan, Kirstin Edwards and Nick Saunders, 2009, Caister Academic Press, Norfolk, UK; Anand, *Techniques for the Analysis of Complex Genomes*, (Academic Press, New York, 1992); Guthrie and Fink, *Guide to Yeast Genetics and Molecular Biology* (Academic Press, New York, 1991); *Oligonucleotide Synthesis* (N. Gait, Ed., 1984); *Nucleic Acid The Hybridization* (B. Hames & S. Higgins, Eds., 1985); *Transcription and Translation* (B. Hames & S. Higgins, Eds., 1984); *Animal Cell Culture* (R. Freshney, Ed., 1986); Perbal, *A Practical Guide to Molecular Cloning* (1984); *Next-Generation Genome Sequencing* (Janitz, 2008 Wiley-VCH); *PCR Protocols (Methods in Molecular Biology)* (Park, Ed., 3rd Edition, 2010 Humana Press); *Immobilized Cells And Enzymes* (IRL Press, 1986); the treatise, *Methods In Enzymology* (Academic Press, Inc., N.Y.); *Gene Transfer Vectors For Mammalian Cells* (J. H. Miller and M. P. Calos eds., 1987, Cold Spring Harbor Laboratory); Harlow and Lane, Antibodies, (Cold Spring Harbor Laboratory Press, Cold Spring Harbor, N.Y., 1998); *Immunochemical Methods In Cell And Molecular Biology* (Mayer and Walker, eds., Academic Press, London, 1987); *Handbook Of Experimental Immunology*, Volumes I-IV (D. M. Weir and C C Blackwell, eds., 1986); Roitt, *Essential Immunology*, 6th Edition, (Blackwell Scientific Publications, Oxford, 1988); *Current Protocols in Immunology* (Q. E. Coligan, A. M. Kruisbeek, D. H. Margulies, E. M. Shevach and W. Strober, eds., 1991); *Annual Review of Immunology*; as well as monographs in journals such as Advances in Immunology.

B. Definitions

Prior to setting forth this disclosure in more detail, it may be helpful to an understanding thereof to provide definitions of certain terms to be used herein.

Unless defined otherwise, all technical and scientific terms used herein have the same meaning as commonly understood by those of ordinary skill in the art to which the invention belongs. Although any methods and materials similar or equivalent to those described herein can be used in the practice or testing of particular embodiments, preferred embodiments of compositions, methods and materials are described herein. For the purposes of the present disclosure, the following terms are defined below.

The articles "a," "an," and "the" are used herein to refer to one or to more than one (i.e., to at least one, or to one or more) of the grammatical object of the article. By way of example, "an element" means one element or one or more elements.

The use of the alternative (e.g., "or") should be understood to mean either one, both, or any combination thereof of the alternatives.

The term "and/or" should be understood to mean either one, or both of the alternatives.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are present that materially affect the activity or action of the listed elements.

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment. Thus, the appearances of the foregoing phrases in various places throughout this specification are not necessarily all referring to the same embodiment. Furthermore, the particular features, structures, or characteristics may be combined in any suitable manner in one or more embodiments. It is also understood that the positive recitation of a feature in one embodiment, serves as a basis for excluding the feature in a particular embodiment.

A "dimerizing agent regulated immunoreceptor complex" or "DARIC" refers to a multi-chain chimeric receptor comprising a signaling component that comprises a multimerization domain polypeptide or variant thereof, e.g., FRB, a transmembrane domain, and one or more T cell intracellular signaling domains and a binding components that comprises a binding domain, a multimerization domain polypeptide or variant thereof, e.g., FKBP12, a transmembrane domain, and one or more intracellular signaling domains.

Additional definitions are set forth throughout this disclosure.

C. Antibodies

In particular embodiments, an antibody or antigen binding fragment thereof is provided.

The term "antibody" refers to a binding agent that is a polypeptide comprising at least a light chain or heavy chain immunoglobulin variable region or fragment thereof which specifically recognizes and binds an epitope of an antigen, such as a peptide, lipid, polysaccharide, or nucleic acid containing an antigenic determinant, such as those recognized by an immune cell.

An "isolated antibody or antigen binding fragment thereof" is one which has been identified and separated and/or recovered from a component of its natural environment.

The terms "specific binding affinity" or "specifically binds" or "specifically bound" or "specific binding" or "specifically targets" as used herein, describe binding of an anti-FRB antibody or antigen binding fragment thereof to an FRB polypeptide at greater binding affinity than background binding. An antibody or antigen binding fragment thereof "specifically binds" to an FRB polypeptide if it binds to or associates with an FRB polypeptide with an affinity or $K_a$ (i.e., an equilibrium association constant of a particular binding interaction with units of 1/M) of, for example, greater than or equal to about $10^5 M^{-1}$. In certain embodiments, an antibody or antigen binding fragment thereof binds to a target with a $K_a$ greater than or equal to about $10^6$ $M^{-1}$, $10^7 M^{-1}$, $10^8 M^{-1}$, $10^9 M^{-1}$, $10^{10} M^-$, $1011 M^-$, $10^{12}$ $M^-$, or $10^{13} M^{-1}$. "High affinity" antibody or antigen binding fragment thereof have a $K_a$ of at least $10^7 M^{-1}$, at least $10^8$ $M^{-1}$, at least $10^9 M^{-1}$, at least $10^{10} M^{-1}$, at least $10^{11} M^{-1}$, at least $10^{12} M^{-1}$, at least $10^{13} M^{-1}$, or greater.

Alternatively, affinity may be defined as an equilibrium dissociation constant ($K_d$) of a particular binding interaction with units of M (e.g., $10^{-5}$ M to $10^{-13}$ M, or less). Affinities of antibody or antigen binding fragment thereof contemplated herein can be readily determined using conventional techniques, e.g., by competitive ELISA (enzyme-linked immunosorbent assay), or by binding association, or displacement assays using labeled ligands, or using a surface-plasmon resonance device such as the Biacore T100, which is available from Biacore, Inc., Piscataway, N.J., or optical biosensor technology such as the EPIC system or EnSpire that are available from Corning and Perkin Elmer respectively (see also, e.g., Scatchard et al. (1949) Ann. N.Y. Acad. Sci. 51:660; and U.S. Pat. Nos. 5,283,173; 5,468,614, or the equivalent).

In one embodiment, the affinity of specific binding is about 2 times greater than background binding, about 5 times greater than background binding, about 10 times greater than background binding, about 20 times greater than background binding, about 50 times greater than background binding, about 100 times greater than background binding, or about 1000 times greater than background binding or more.

An "antigen (Ag)" refers to a compound, composition, or substance that can stimulate the production of antibodies or a T cell response in an animal, including compositions (such as one that includes a cancer-specific protein) that are injected or absorbed into an animal. An antigen reacts with the products of specific humoral or cellular immunity, including those induced by heterologous antigens, such as the disclosed antigens. In particular embodiments, the target antigen is an epitope of an FRB polypeptide.

An "epitope" or "antigenic determinant" refers to the region of an antigen to which a binding agent binds. Epitopes can be formed both from contiguous amino acids or noncontiguous amino acids juxtaposed by tertiary folding of a protein. Epitopes formed from contiguous amino acids are typically retained on exposure to denaturing solvents whereas epitopes formed by tertiary folding are typically lost on treatment with denaturing solvents. An epitope typically includes at least 3, and more usually, at least 5, about 9, or about 8-10 amino acids in a unique spatial conformation.

Antibodies include, in particular embodiments, antigen binding fragments thereof, such as a Fab' fragment, a F(ab')2 fragment, a bispecific Fab dimer (Fab2), a trispecific Fab trimer (Fab3), an Fv, an single chain Fv protein ("scFv"), a bis-scFv, (scFv)$_2$, a minibody, a diabody, a triabody, a tetrabody, a disulfide stabilized Fv protein ("dsFv"), and a single-domain antibody (sdAb, a camelid VHH, Nanobody) and portions of full length antibodies responsible for antigen binding. The term also includes genetically engineered forms such as chimeric antibodies (for example, humanized murine antibodies), heteroconjugate antibodies (such as, bispecific antibodies) and antigen binding fragments thereof, in particular embodiments. See also, Pierce Catalog and Handbook, 1994-1995 (Pierce Chemical Co., Rockford, Ill.); Kuby, J., Immunology, $3_{rd}$ Ed., W. H. Freeman & Co., New York, 1997.

As would be understood by the skilled person and as described elsewhere herein, a complete antibody comprises two heavy chains and two light chains. Each heavy chain consists of a variable region and a first, second, and third constant region, while each light chain consists of a variable region and a constant region. Mammalian heavy chains are classified as α, δ, ε, γ, and µ. Mammalian light chains are classified as λ or κ. Immunoglobulins comprising the α, δ, ε, γ, and µ heavy chains are classified as immunoglobulin (Ig)A, IgD, IgE, IgG, and IgM. The complete antibody forms a "Y" shape. The stem of the Y consists of the second and third constant regions (and for IgE and IgM, the fourth constant region) of two heavy chains bound together and disulfide bonds (inter-chain) are formed in the hinge. Heavy chains γ, α and δ have a constant region composed of three tandem (in a line) Ig domains, and a hinge region for added flexibility; heavy chains µ and ε have a constant region composed of four immunoglobulin domains. The second and third constant regions are referred to as "CH2 domain" and "CH3 domain", respectively. Each arm of the Y includes the variable region and first constant region of a single heavy chain bound to the variable and constant regions of a single light chain. The variable regions of the light and heavy chains are responsible for antigen binding.

Light and heavy chain variable regions contain a "framework" region interrupted by three hypervariable regions, also called "complementarity-determining regions" or "CDRs." The CDRs can be defined or identified by conventional methods, such as by sequence according to Kabat et al. (Wu, T T and Kabat, E. A., J Exp Med. 132(2):211-50, (1970); Borden, P. and Kabat E. A., PNAS, 84: 2440-2443 (1987); (see, Kabat et al., Sequences of Proteins of Immunological Interest, U.S. Department of Health and Human Services, 1991, which is hereby incorporated by reference), or by structure according to Chothia et al. (Chothia, C. and Lesk, A. M., *J Mol. Biol.*, 196(4): 901-917 (1987), Chothia, C. et al, *Nature,* 342: 877-883 (1989)).

Illustrative examples of rules for predicting light chain CDRs include: CDR-L1 starts at about residue 24, is preceded by a Cys, is about 10-17 residues, and is followed by a Trp (typically Trp-Tyr-Gln, but also, Trp-Leu-Gln, Trp-Phe-Gln, Trp-Tyr-Leu); CDR-L2 starts about 16 residues after the end of CDR-L1, is generally preceded by Ile-Tyr, but also, Val-Tyr, Ile-Lys, Ile-Phe, and is 7 residues; and CDR-L3 starts about 33 residues after the end of CDR-L2, is preceded by a Cys, is 7-11 residues, and is followed by Phe-Gly-XXX-Gly (SEQ ID NO:62) (XXX is any amino acid).

Illustrative examples of rules for predicting heavy chain CDRs include: CDR-H1 starts at about residue 26, is preceded by Cys-XXX-XXX-XXX (SEQ ID NO:63), is 10-12 residues and is followed by a Trp (typically Trp-Val, but also, Trp-Ile, Trp-Ala); CDR-H2 starts about 15 residues after the end of CDR-H1, is generally preceded by Leu-Glu-Trp-Ile-Gly (SEQ ID NO:64), or a number of variations, is 16-19 residues, and is followed by Lys/Arg-Leu/Ile/Val/Phe/Thr/Ala-Thr/Ser/Ile/Ala; and CDR-H3 starts about 33 residues after the end of CDR-H2, is preceded by Cys-XXX-XXX (typically Cys-Ala-Arg), is 3 to 25 residues, and is followed by Trp-Gly-XXX-Gly (SEQ ID NO:65).

In one embodiment, light chain CDRs and the heavy chain CDRs are determined according to the Kabat method In one embodiment, light chain CDRs and the heavy chain CDR2 and CDR3 are determined according to the Kabat method, and heavy chain CDR1 is determined according to the AbM method, which is a comprise between the Kabat and Clothia methods, see e.g., Whitelegg N & Rees A R, *Protein Eng.* 2000 December; 13(12):819-24 and *Methods Mol Biol.* 2004; 248:51-91. Programs for predicting CDRs are publicly available, e.g., AbYsis (www.bioinf.org.uk/abysis/).

The sequences of the framework regions of different light or heavy chains are relatively conserved within a species, such as humans. The framework region of an antibody, that is the combined framework regions of the constituent light and heavy chains, serves to position and align the CDRs in three-dimensional space. The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, the CDRs located in the variable domain of the heavy chain of the antibody are referred to as CDRH1, CDRH2, and CDRH3, whereas the CDRs located in the variable domain of the light chain of the antibody are referred to as CDRL1, CDRL2, and CDRL3. Antibodies with different specificities (i.e., different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs).

Illustrative examples of light chain CDRs include the CDR sequences set forth in SEQ ID NOs: 1-3, 11-13, 21-23, 31-33, and 41-43. Illustrative examples of heavy chain CDRs include the CDR sequences set forth in SEQ ID NOs: 4-6, 14-16, 24-26, 34-36, and 44-46.

References to "$V_L$" or "VL" refer to the variable region of an immunoglobulin light chain, including that of an antibody, Fv, scFv, dsFv, Fab, or other antibody fragment as disclosed herein. Illustrative examples of light chain variable regions include the light chain variable region sequences set forth in SEQ ID NO: 7, 9, 17, 19, 27, 29, 37, 39, 47, and 49.

References to "$V_H$" or "VH" refer to the variable region of an immunoglobulin heavy chain, including that of an antibody, Fv, scFv, dsFv, Fab, or other antibody fragment as disclosed herein. Illustrative examples of heavy chain variable regions include the heavy chain variable region sequences set forth in SEQ ID NO: 8, 10, 18, 20, 28, 30, 38, 40, 48, and 50.

A "monoclonal antibody" is an antibody produced by a single clone of B lymphocytes or by a cell into which the light and heavy chain genes of a single antibody have been transfected. Monoclonal antibodies are produced by methods known to those of skill in the art, for instance by making hybrid antibody-forming cells from a fusion of myeloma cells with immune spleen cells. Monoclonal antibodies include humanized monoclonal antibodies. In particular embodiments, the antibody is a rabbit monoclonal antibody or antigen binding fragment thereof.

In preferred embodiments, the antibody is a rabbit antibody (such as a rabbit monoclonal antibody) or fragment thereof that specifically binds to an FRB polypeptide.

In one embodiment, an antibody is a "humanized" antibody. A humanized antibody is an immunoglobulin including a human framework region and one or more CDRs from a non-human (for example a mouse, rat, or synthetic) immunoglobulin. The non-human immunoglobulin providing the CDRs is termed a "donor," and the human immunoglobulin providing the framework is termed an "acceptor." In one embodiment, all the CDRs are from the donor immunoglobulin in a humanized immunoglobulin. Constant regions need not be present, but if they are, they must be substantially identical to human immunoglobulin constant regions, i.e., at least about 85-90%, such as about 95% or more identical. Hence, all parts of a humanized immunoglobulin, except possibly the CDRs, are substantially identical to corresponding parts of natural human immunoglobulin sequences. Humanized or other monoclonal antibodies can have additional conservative amino acid substitutions, which have substantially no effect on antigen binding or other immunoglobulin functions. Humanized antibodies can be constructed by means of genetic engineering (see for example, U.S. Pat. No. 5,585,089).

Papain digestion of antibodies produces two identical antigen-binding fragments, called "Fab" fragments, each with a single antigen-binding site, and a residual "Fc" fragment, whose name reflects its ability to crystallize readily. Pepsin treatment yields an F(ab')2 fragment that has two antigen-combining sites and is still capable of cross-linking antigen.

"Fv" is the minimum antibody fragment which contains a complete antigen-binding site. In one embodiment, a two-chain Fv species consists of a dimer of one heavy- and one light-chain variable domain in tight, non-covalent association. In a single-chain Fv (scFv) species, one heavy- and one light-chain variable domain can be covalently linked by a flexible peptide linker such that the light and heavy chains can associate in a "dimeric" structure analogous to that in a two-chain Fv species. It is in this configuration that the three hypervariable regions (HVRs) of each variable domain interact to define an antigen-binding site on the surface of the VH-VL dimer. Collectively, the six HVRs confer antigen-binding specificity to the antibody. However, even a single variable domain (or half of an Fv comprising only three HVRs specific for an antigen) has the ability to recognize and bind antigen, although at a lower affinity than the entire binding site.

The Fab fragment contains the heavy- and light-chain variable domains and also contains the constant domain of the light chain and the first constant domain (CH1) of the heavy chain. Fab' fragments differ from Fab fragments by the addition of a few residues at the carboxy terminus of the heavy chain CH1 domain including one or more cysteines from the antibody hinge region. Fab'-SH is the designation herein for Fab' in which the cysteine residue(s) of the constant domains bear a free thiol group. F(ab')2 antibody fragments originally were produced as pairs of Fab' fragments which have hinge cysteines between them. Other chemical couplings of antibody fragments are also known.

The term "diabodies" refers to antibody fragments with two antigen-binding sites, which fragments comprise a heavy-chain variable domain (VH) connected to a light-chain variable domain (VL) in the same polypeptide chain (VH-VL). By using a linker that is too short to allow pairing between the two domains on the same chain, the domains are forced to pair with the complementary domains of another chain and create two antigen-binding sites. Diabodies may be bivalent or bispecific. Diabodies are described more fully in, for example, EP 404,097; WO 1993/01161; Hudson et al., *Nat. Med.* 9:129-134 (2003); and Hollinger et al., *PNAS USA* 90: 6444-6448 (1993). Triabodies and tetrabodies are also described in Hudson et al., *Nat. Med.* 9:129-134 (2003).

"Single domain antibody" or "sdAb" or "nanobody" refers to an antibody fragment that consists of the variable region of an antibody heavy chain (VH domain) or the variable region of an antibody light chain (VL domain) (Holt, L., et al, *Trends in Biotechnology,* 21(11): 484-490).

"Single-chain Fv" or "scFv" antibody fragments comprise the VH and VL domains of antibody, wherein these domains are present in a single polypeptide chain and in either orientation (e.g., VL-VH or VH-VL). Generally, the scFv polypeptide further comprises a polypeptide linker between the VH and VL domains which enables the scFv to form the desired structure for antigen binding. For a review of scFv, see, e.g., Pluckthün, in *The Pharmacology of Monoclonal Antibodies,* vol. 113, Rosenburg and Moore eds., (Springer-Verlag, New York, 1994), pp. 269-315.

In preferred embodiments, the anti-FRB antigen binding fragment is an scFv. In particular embodiments, the scFv is a rabbit scFv. Single chain antibodies may be cloned form the V region genes of a hybridoma specific for a desired target. The production of such hybridomas has become routine. A technique which can be used for cloning the variable region heavy chain (VH) and variable region light chain (VL) has been described, for example, in Orlandi et al., *PNAS,* 1989; 86: 3833-3837.

In various embodiments, an anti-FRB antibody or antigen binding fragment thereof comprises a variable light chain sequence comprising CDRL1-CDRL3 sequences set forth in SEQ ID NOs: 1-3, 11-13, 21-23, 31-33, and 41-43, and/or a variable heavy chain sequence comprising CDRH1-CDRH3 sequences set forth in SEQ ID NOs: 4-6, 14-16, 24-26, 34-36, and 44-46. In some embodiments, the anti-FRB antibody or antigen binding fragment thereof comprises a variable light chain sequence as set forth in SEQ ID NO: 7, 9, 17, 19, 27, 29, 37, 39, 47, and 49 and/or a variable heavy chain sequence as set forth in SEQ ID NO: 8, 10, 18, 20, 28, 30, 38, 40, 48, and 50.

FRB-specific binding domains provided in particular embodiments also comprise one, two, three, four, five, or six CDRs. Such CDRs may be nonhuman CDRs or altered nonhuman CDRs selected from CDRL1, CDRL2 and CDRL3 of the light chain and CDRH1, CDRH2 and CDRH3 of the heavy chain. In certain embodiments, an FRB-specific binding domain comprises (a) a light chain variable region that comprises a light chain CDRL1, a light chain CDRL2, and a light chain CDRL3, and (b) a heavy chain variable region that comprises a heavy chain CDRH1, a heavy chain CDRH2, and a heavy chain CDRH3.

In one embodiment, an FRB-specific binding domain comprises light chain CDR sequences set forth in SEQ ID NOs: 1-3, 11-13, 21-23, 31-33, and 41-43. In a particular embodiment, an FRB-specific binding domain comprises light chain CDR sequences with at least 85%, 86%, 87%, 88%, 89%, 90%, 91%, 92%, 93%, 94%, 95%, 96%, 97%, 98%, or 99% amino acid identity to the light chain CDR sequences set forth in SEQ ID NOs: 1-3, 11-13, 21-23, 31-33, and 41-43.

In one embodiment, an FRB-specific binding domain comprises heavy chain CDR sequences set forth in SEQ ID NOs: 4-6, 14-16, 24-26, 34-36, and 44-46. In a particular embodiment, an FRB-specific binding domain comprises heavy chain CDR sequences with at least 85%, 86%, 87%, 88%, 89%, 90%, 91%, 92%, 93%, 94%, 95%, 96%, 97%, 98%, or 99% amino acid identity to the heavy chain CDR sequences set forth in SEQ ID NOs: 4-6, 14-16, 24-26, 34-36, and 44-46.

In particular embodiments, the anti-FRB antibody or antigen binding fragment thereof comprises one or more light chain CDRs as set forth in any one of SEQ ID NOs: 1-3, 11-13, 21-23, 31-33, and 41-43 and/or one or more heavy chain CDRs as set forth in any one of SEQ ID NOs: 4-6, 14-16, 24-26, 34-36, and 44-46. In certain embodiments, the anti-FRB antibody or antigen binding fragment thereof comprises a variable light chain sequence with at least 85%, 86%, 87%, 88%, 89%, 90%, 91%, 92%, 93%, 94%, 95%, 96%, 97%, 98%, or 99% amino acid identity to the variable light chain sequence set forth in SEQ ID NO: 7, 9, 17, 19, 27, 29, 37, 39, 47, and 49 and/or a variable heavy chain sequence with at least 85%, 86%, 87%, 88%, 89%, 90%, 91%, 92%, 93%, 94%, 95%, 96%, 97%, 98%, or 99% amino acid identity to the variable heavy chain sequence set forth in SEQ ID NO: 8, 10, 18, 20, 28, 30, 38, 40, 48, and 50.

In particular embodiments, the anti-FRB antibody or antigen binding fragment thereof comprises the light chain CDRs as set forth in SEQ ID NOs: 1-3 and the heavy chain CDRs as set forth in SEQ ID NOs: 4-6 and at least 95% amino acid identity to the variable light chain sequence as set forth in SEQ ID NO: 7 and the variable heavy chain sequence as set forth in SEQ ID NO: 8.

In particular embodiments, the anti-FRB antibody or antigen binding fragment thereof comprises the light chain CDRs as set forth in SEQ ID NOs: 1-3 and the heavy chain CDRs as set forth in SEQ ID NOs: 4-6 and at least 95% amino acid identity to the variable light chain sequence as set forth in SEQ ID NO: 9 and the variable heavy chain sequence as set forth in SEQ ID NO: 10.

In particular embodiments, the anti-FRB antibody or antigen binding fragment thereof comprises the light chain CDRs as set forth in SEQ ID NOs: 11-13 and the heavy chain CDRs as set forth in SEQ ID NOs: 14-16 and at least 95% amino acid identity to the variable light chain sequence as set forth in SEQ ID NO: 17 and the variable heavy chain sequence as set forth in SEQ ID NO: 18.

In particular embodiments, the anti-FRB antibody or antigen binding fragment thereof comprises the light chain CDRs as set forth in SEQ ID NOs: 11-13 and the heavy chain CDRs as set forth in SEQ ID NOs: 14-16 and at least 95% amino acid identity to the variable light chain sequence as set forth in SEQ ID NO: 19 and the variable heavy chain sequence as set forth in SEQ ID NO: 20.

In particular embodiments, the anti-FRB antibody or antigen binding fragment thereof comprises the light chain CDRs as set forth in SEQ ID NOs: 21-23 and the heavy chain CDRs as set forth in SEQ ID NOs: 24-26 and at least 95% amino acid identity to the variable light chain sequence as set forth in SEQ ID NO: 27 and the variable heavy chain sequence as set forth in SEQ ID NO: 28.

In particular embodiments, the anti-FRB antibody or antigen binding fragment thereof comprises the light chain CDRs as set forth in SEQ ID NOs: 21-23 and the heavy chain CDRs as set forth in SEQ ID NOs: 24-26 and at least 95% amino acid identity to the variable light chain sequence as set forth in SEQ ID NO: 29 and the variable heavy chain sequence as set forth in SEQ ID NO: 30.

In particular embodiments, the anti-FRB antibody or antigen binding fragment thereof comprises the light chain CDRs as set forth in SEQ ID NOs: 31-33 and the heavy chain CDRs as set forth in SEQ ID NOs: 34-36 and at least 95% amino acid identity to the variable light chain sequence as set forth in SEQ ID NO: 37 and the variable heavy chain sequence as set forth in SEQ ID NO: 38.

In particular embodiments, the anti-FRB antibody or antigen binding fragment thereof comprises the light chain CDRs as set forth in SEQ ID NOs: 31-33 and the heavy chain CDRs as set forth in SEQ ID NOs: 34-36 and at least 95% amino acid identity to the variable light chain sequence as set forth in SEQ ID NO: 39 and the variable heavy chain sequence as set forth in SEQ ID NO: 40.

In particular embodiments, the anti-FRB antibody or antigen binding fragment thereof comprises the light chain CDRs as set forth in SEQ ID NOs: 41-43 and the heavy chain CDRs as set forth in SEQ ID NOs: 44-46 and at least 95% amino acid identity to the variable light chain sequence as set forth in SEQ ID NO: 47 and the variable heavy chain sequence as set forth in SEQ ID NO: 48.

In particular embodiments, the anti-FRB antibody or antigen binding fragment thereof comprises the light chain CDRs as set forth in SEQ ID NOs: 41-43 and the heavy chain CDRs as set forth in SEQ ID NOs: 44-46 and at least 95% amino acid identity to the variable light chain sequence as set forth in SEQ ID NO: 49 and the variable heavy chain sequence as set forth in SEQ ID NO: 50.

D. Conjugates

In various embodiments, a conjugate comprising an anti-FRB antibody or antigen binding fragment thereof and a label is provided. In particular embodiments, a conjugate comprises an anti-FRB antibody or antigen binding fragment thereof, and a detectable label or a label capable of producing a detectable signal. In more particular embodiments, a conjugate comprises an anti-FRB antibody or antigen binding fragment thereof, coupled to a detectable label. In even more particular embodiments, a conjugate comprises an anti-FRB antibody or antigen binding fragment thereof, covalently bound, or chemically coupled to, a detectable label.

As used herein, the term "label" refers to a detectable label or a label capable of producing a detectable signal. In particular embodiments, a label comprises a radionuclides, nucleic acid, small molecule, or polypeptide. In some embodiments, labels are directly detectable. In some embodiments, labels are indirectly detectable.

Illustrative examples of detectable labels suitable for use in conjugates contemplated in particular embodiments include, but are not limited to: haptens, fluorescent molecules, fluorescent dyes, fluorescent proteins, chromophores, metal ions, gold particles, silver particles, magnetic particles, radionuclides, polypeptides, enzymes, luminescent compounds, or oligonucleotides.

Illustrative examples of molecules suitable for use as detectable labels in particular embodiments include, but are not limited to: Oregon Green®; Pacific Blue™; Pacific Orange™; Pacific Green™; Cascade Blue™; Cascade Yellow™; Lucifer Yellow™; Marina Blue™; Texas Red® (TxRed); AlexaFluor® (AF) dyes, e.g., AF350, AF405, AF488, AF500, AF514, AF532, AF546, AF555, AF568, AF594, AF610, AF633, AF635, AF647, AF680, AF700, AF710, AF750, AF790, and AF800; QDot® nanocrystals, e.g., Qdot®525, Qdot®565, Qdot®585, Qdot®605, Qdot®655, Qdot®705, and Qdot®800; DyLight™ Dyes (DL), e.g., DL549, DL649, DL680, and DL800; fluorescein or a derivative thereof, e.g., fluorescein isothiocyanate, carboxyfluorescein, and dichlorotriazinylamine fluorescein; digoxigenin; dinitrophenol (DNP); trinitrophenol (TNP); biotin; Cy dyes, e.g., Cy2, Cy3, Cy3.5, Cy5, Cy5.5, Cy7, and Cy 7.5; Phycoerythrin (PE, R-Phycoerythrin (RPE)); B-Phycoerythrin (BPE); Peridinin Chlorophyll (PerCP); Allophycocyanin (APC); C-Phycocyanin; Atto® Dyes, e.g., Atto 390, Atto 425, Atto 465, Atto 488, Atto 495, Atto 514Atto 520, Atto 532, Atto 550, Atto 565, Atto 590, Atto 594, Atto 610, Atto 620, Atto 633, Atto 647, Atto 655, Atto 665, Atto 680, Atto 700, Atto 725, and Atto 740; Super Bright™ Dyes, e.g., Super Bright™ 436, Super Bright™ 600, Super Bright™ 645, Super Bright™ 702, and Super Bright™ 780; Brilliant™ Dyes, e.g., Brilliant™ Violet 421, Brilliant™ Violet 480, Brilliant™ Violet 510, Brilliant™ Violet 605, Brilliant Violet™ 650, Brilliant Violet™ 711, Brilliant Violet™ 786, Brilliant™ Ultraviolet 395 (BUV395), Brilliant™ Ultraviolet 496 (BUV496), Brilliant™ Ultraviolet 563 (BUV563), Brilliant™ Ultraviolet 661 (BUV661), Brilliant™ Ultraviolet 737 (BUV737), Brilliant™ Ultraviolet 805 (BUV805), Brilliant™ Blue 515 (BB515), and Brilliant™ Blue 700 (BB700); and IR Dyes, e.g., IR Dye 680, IR Dye 680LT, IR Dye 700, IR Dye 700DX, IR Dye 800, IR Dye 800RS, and IR Dye 800CW.

Illustrative examples of tandem fluorescent dye molecules suitable for use as detectable labels include, but are not limited to: RPE-Cy5, RPE-Cy5.5, RPE-Cy7, RPE-CF594, RPE-AlexaFluor® tandem conjugates; RPE-Alexa610, RPE-TxRed, APC-H7, APC-R700, APC-Alexa600, APC-Alexa610, APC-Alexa750, APC-Cy5, APC-Cy5.5, and APC-Cy7.

Illustrative examples of fluorescent proteins suitable for use as detectable labels include, but are not limited to: GFP, eGFP, BFP, CFP, YFP, DsRed, DsRed2, mRFP, mBanana, mOrange, dTomato, tdTomato, mTangerine, mStrawberry, mCherry, mPlum, and mRaspberry.

Illustrative examples of enzymes suitable for use as detectable labels include, but are not limited to: alkaline phosphatase, horseradish peroxidase, luciferase, and β-galactosidase.

Illustrative examples of radionuclides suitable for use as detectable labels include, but are not limited to: carbon (14C), chromium (51Cr), cobalt (57Co), fluorine (18F), gadolinium (153Gd, 159Gd), germanium (68Ge), holmium (166Ho), indium (115In, 113In, 112In, min), iodine (125I, 123I, 121I), lanthanum (140La), lutetium (177Lu), manganese (54Mn), molybdenum (99Mo), palladium (103Pd), phosphorous (32P), praseodymium (142 Pr), promethium (149Pm), rhenium (186Re, 188Re), rhodium (105Rh), rutheroium (97Ru), samarium (153Sm), scandium (47Sc), selenium (75Se), (85Sr), sulphur (35S), technetium (99Tc), thallium (201Ti), tin (113Sn, 117Sn), tritium (3H), xenon (133Xe), ytterbium (169Yb, 175Yb), and yttrium (90Y).

In particular embodiments, a conjugate comprises an antibody or antibody fragment that is conjugated, coupled, or linked (e.g., covalently bonded) to one or more labels. In certain embodiments, a label may be conjugated, coupled, or linked to an antibody or fragment either directly or indirectly (e.g., via a linker group). An antibody can be directly covalently bound to one or more labels when the antibody and the label each possesses a substituent capable of reacting with the other. For example, a nucleophilic group, such as an amino or sulfhydryl group, on one may be capable of reacting with a carbonyl-containing group, such as an anhydride or an acid halide, or with an alkyl group containing a good leaving group (e.g., a halide) on the other.

In particular embodiments, it may be desirable to couple, conjugate, or link an antibody or antibody fragment to one or more labels via a monovalent or polyvalent linker or a spacer. A linker or spacer can be used to provide sufficient distance between an antibody and a label to avoid steric hindrance or interference with antibody binding capabilities. It will be evident to those skilled in the art that a variety of bifunctional or polyfunctional reagents, both homo- and hetero-functional (such as those described in the catalog of the Pierce Chemical Co., Rockford, Ill.), may be employed as the linker group. Coupling may be effected, for example, through amino groups, carboxyl groups, sulfhydryl groups or oxidized carbohydrate residues. There are numerous references describing such methodology, e.g., U.S. Pat. No. 4,671,958, to Rodwell et al.

In certain embodiments, a linker has an overall chain length of about 1-100 atoms, 1-80 atoms, 1-60 atoms, 1-40 atoms, 1-30 atoms, 1-20 atoms, or 1, 2, 3, 4, 5, 6, 7, 8, 9, 10, 11, 12, 13, 14, 15, 16, 17, 18, 19, or 20 atoms, wherein the atoms in the chain comprise C, S, N, P, and 0.

Illustrative examples of linkers or linkages useful in particular embodiments of the present invention include, but are not limited to one or more of the following: —C(O)—, —NH—C(O)—, —C(O)—NH—, —C(O)—NH—$(CH_2)_{2-6}$—NH—C(O)—, —NH—$(CH_2)_{2-6}$—NH—C(O)—, -triazole-$(CH_2)_{2-6}$—NH—C(O)—, —S—$(CH_2)_{2-6}$—NH—C(O)—, —S—$(CH_2)_{0-6}$—CH(CONH$_2$)—$(CH_2)_{0-6}$—NH—C(O)—, —S—$(CH_2)_{0-6}$—CH(CONH-PEG)-$(CH_2)_{0-6}$—NH—C(O)—, —S—S—$(CH_2)_{2-6}$—NH—C(O)—, —S—S—$(CH_2)_{0-6}$—CH(CONH$_2$)—$(CH_2)_{0-6}$—NH—C(O)—, —S—S—$(CH_2)_{0-6}$—CH(CONH-PEG)-$(CH_2)_{0-6}$—NH—C(O)—, —NH—$(CH_2)_{0-6}$—CH(CONH-PEG)-$(CH_2)_{0-6}$—NH—C(O)—, —NH—$(CH_2)_{0-6}$—CH(CONH$_2$)—$(CH_2)_{0-6}$—NH—C(O)— —C=N—O—$(CH_2)_{2-6}$—NH—C(O)—, —C=N—NH—(CO)—$(CH_2)_{2-6}$—NH—C(O)—, -succinimide-$(CH_2)_{2-6}$—NH—C(O)—, -diazodicarboxamide-(Phenyl)-J-$(CH_2)_{2-6}$—NH—C(O)—, J is O, CH$_2$, NH, S, NH(CO), (CO)NH, —NH—$(CH_2)_{2-6}$—, $(CH_2)_{1-6}$—NH—C(O)—NH—$(CH_2)_{2-6}$—, —C(S)—$(CH_2)_{0-6}$—, —$(CH_2)_{1-6}$—C(O)—NH—$(CH_2)_{2-6}$—, —$(CH_2)_{1-6}$—NH—C(O)—$(CH_2)_{2-6}$—, —$(CH_2)_{1-6}$—O—C(O)—NH—$(CH_2)_{2-6}$—, —$(CH_2)_{1-6}$—NH—C(O)—O—$(CH_2)_{2-6}$—, $(CH_2)_{1-6}$—NH—$(CH_2)_{2-6}$, $(CH_2)_{1-6}$—C(O—$(CH_2)_{2-6}$—, branched or unbranched —C$_1$-C16-alkyl, branched or unbranched —C1-C16-alkyl where one of the carbon atoms can be optionally substituted with a heteroatom, R$^2$—NH—$(CH_2)_{2-6}$—NH—C(O)—, R$^2$—S—$(CH_2)_{2-6}$—NH—C(O)—, R$^2$-triazole-$(CH_2)_{2-6}$—NH—C(O)—, R$^2$—NH—O—$(CH_2)_{2-6}$—NH—C(O)—, R$^2$=N—NH—(CO)—$(CH_2)_{2-6}$—NH—C(O)—, R$^2$ is one to three bifunctional or trifunctional substituted cross-linking organic radicals selected from the group consisting of alkyl, substituted alkyl, cycloalkyl, aryl, heteroaryl, polyethylene glycol (PEG) [i.e., —$(CH_2CH_2O)_{1-20}$].

In particular embodiments, a conjugate comprises an anti-FRB antibody or antibody fragment covalently bound to a polypeptide-based label, e.g., a fluorescent protein or enzyme, via a polypeptide linker contemplated elsewhere herein, infra.

E. Polypeptides

Various polypeptides are contemplated herein, including, but not limited to antibodies and antigen binding fragments thereof.

"Polypeptide," "polypeptide fragment," "peptide" and "protein" are used interchangeably, unless specified to the contrary, and according to conventional meaning, i.e., as a sequence of amino acids. Polypeptides are not limited to a specific length, e.g., they may comprise a full-length protein sequence or a fragment of a full-length protein, and may include post-translational modifications of the polypeptide, for example, glycosylations, acetylations, phosphorylations and the like, as well as other modifications known in the art, both naturally occurring and non-naturally occurring.

An "isolated peptide" or an "isolated polypeptide" and the like, as used herein, refer to in vitro isolation and/or purification of a peptide or polypeptide molecule from a cellular environment, and from association with other components of the cell, i.e., it is not significantly associated with in vivo substances. In particular embodiments, an isolated polypeptide is a synthetic polypeptide, a semi-synthetic polypeptide, or a polypeptide obtained or derived from a recombinant source.

Similarly, an "isolated cell" refers to a cell that has been obtained from an in vivo tissue or organ and is substantially free of extracellular matrix.

Polypeptides include "polypeptide variants." Polypeptide variants may differ from a naturally occurring polypeptide in one or more substitutions, deletions, additions and/or insertions. Such variants may be naturally occurring or may be synthetically generated, for example, by modifying one or more of the above polypeptide sequences. For example, in particular embodiments, it may be desirable to improve the binding affinity and/or other biological properties of an anti-FRB antibody or antigen binding fragment thereof by introducing one or more amino acid substitutions, deletions, additions and/or insertions. In particular embodiments, polypeptides include polypeptides having at least about 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 86%, 97%, 98%, or 99% amino acid identity to any of the reference sequences contemplated herein, typically where the variant maintains at least one biological activity of the reference sequence. In particular embodiments, the biological activity is binding affinity.

Polypeptides variants include biologically active "polypeptide fragments." Illustrative examples of biologically active polypeptide fragments include binding domains and the like. As used herein, the term "biologically active fragment" or "minimal biologically active fragment" refers to a polypeptide fragment that retains at least 100%, at least 90%, at least 80%, at least 70%, at least 60%, at least 50%, at least 40%, at least 30%, at least 20%, at least 10%, or at least 5% of the naturally occurring polypeptide activity. In certain embodiments, a polypeptide fragment can comprise an amino acid chain at least 5 to about 500 amino acids long. It will be appreciated that in certain embodiments, fragments are at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 150, 200, 250, 300, 350, 400, or 450 amino acids long. Particularly useful polypeptide fragments include functional domains, including antigen-binding domains or fragments of antibodies. In the case of an anti-FRB antibody, useful fragments include, but are not limited to: a CDR region, a CDR3 region of the heavy or light chain; a variable region of a heavy or light chain; a portion of an antibody chain or variable region including two CDRs; and the like.

The polypeptide may also be fused in-frame or conjugated to a linker or other sequence for ease of synthesis, purification or identification of the polypeptide (e.g., poly-His), or to enhance binding of the polypeptide to a solid support.

As noted above, polypeptides may be altered in various ways including amino acid substitutions, deletions, truncations, and insertions. Methods for such manipulations are generally known in the art. For example, amino acid sequence variants of a reference polypeptide can be prepared by mutations in the DNA. Methods for mutagenesis and nucleotide sequence alterations are well known in the art. See, for example, Kunkel (1985, *Proc. Natl. Acad. Sci. USA.* 82: 488-492), Kunkel et al., (1987, *Methods in Enzymol,* 154: 367-382), U.S. Pat. No. 4,873,192, Watson, J. D. et al., (*Molecular Biology of the Gene,* Fourth Edition, Benjamin/Cummings, Menlo Park, Calif., 1987) and the references cited therein. Guidance as to appropriate amino acid substitutions that do not affect biological activity of the protein of interest may be found in the model of Dayhoff et al., (1978) *Atlas of Protein Sequence and Structure* (Natl. Biomed. Res. Found., Washington, D.C.).

In certain embodiments, a polypeptide variant comprises one or more conservative substitutions. A "conservative substitution" is one in which an amino acid is substituted for another amino acid that has similar properties, such that one skilled in the art of peptide chemistry would expect the secondary structure and hydropathic nature of the polypeptide to be substantially unchanged. Modifications may be made in the structure of the polynucleotides and polypeptides contemplated in particular embodiments and still obtain a functional molecule that encodes a variant or derivative polypeptide with desirable characteristics. When it is desired to alter the amino acid sequence of a polypeptide to create an equivalent, or even an improved, variant polypeptide, one skilled in the art, for example, can change one or more of the codons of the encoding DNA sequence, e.g., according to Table 1.

TABLE 1

Amino Acid Codons

| Amino Acids | One letter code | Three letter code | Codons | | | | | |
|---|---|---|---|---|---|---|---|---|
| Alanine | A | Ala | GCA | GCC | GCG | | GCU | |
| Cysteine | C | Cys | UGC | | | UGU | | |
| Aspartic acid | D | Asp | GAC | | | GAU | | |
| Glutamic acid | E | Glu | GAA | | | GAG | | |
| Phenylalanine | F | Phe | UUC | | | UUU | | |
| Glycine | G | Gly | GGA | GGC | GGG | | GGU | |
| Histidine | H | His | CAC | | | CAU | | |
| Isoleucine | I | Iso | AUA | AUC | | AUU | | |
| Lysine | K | Lys | AAA | | | AAG | | |
| Leucine | L | Leu | UUA | UUG | CUA | CUC | CUG | CUU |
| Methionine | M | Met | | | AUG | | | |
| Asparagine | N | Asn | AAC | | | AAU | | |
| Proline | P | Pro | CCA | CCC | CCG | | CCU | |
| Glutamine | Q | Gln | CAA | | | CAG | | |
| Arginine | R | Arg | AGA | AGG | CGA | CGC | CGG | CGU |
| Serine | S | Ser | AGC | AGU | UCA | UCC | UCG | UCU |

TABLE 1-continued

Amino Acid Codons

| Amino Acids | One letter code | Three letter code | Codons | | | |
|---|---|---|---|---|---|---|
| Threonine | T | Thr | ACA | ACC | ACG | ACU |
| Valine | V | Val | GUA | GUC | GUG | GUU |
| Tryptophan | W | Trp | | | UGG | |
| Tyrosine | Y | Tyr | UAC | | | UAU |

Guidance in determining which amino acid residues can be substituted, inserted, or deleted without abolishing biological activity can be found using computer programs well known in the art, such as DNASTAR, DNA Strider, Geneious, MacVector, or Vector NTI software. Preferably, amino acid changes in the protein variants disclosed herein are conservative amino acid changes, i.e., substitutions of similarly charged or uncharged amino acids. A conservative amino acid change involves substitution of one of a family of amino acids which are related in their side chains. Naturally occurring amino acids are generally divided into four families: acidic (aspartate, glutamate), basic (lysine, arginine, histidine), non-polar (alanine, valine, leucine, isoleucine, proline, phenylalanine, methionine, tryptophan), and uncharged polar (glycine, asparagine, glutamine, cysteine, serine, threonine, tyrosine) amino acids. Phenylalanine, tryptophan, and tyrosine are sometimes classified jointly as aromatic amino acids. In a peptide or protein, suitable conservative substitutions of amino acids are known to those of skill in this art and generally can be made without altering a biological activity of a resulting molecule. Those of skill in this art recognize that, in general, single amino acid substitutions in non-essential regions of a polypeptide do not substantially alter biological activity (see, e.g., Watson et al. *Molecular Biology of the Gene,* 4th Edition, 1987, The Benjamin/Cummings Pub. Co., p. 224).

In making such changes, the hydropathic index of amino acids may be considered. The importance of the hydropathic amino acid index in conferring interactive biologic function on a protein is generally understood in the art (Kyte and Doolittle, 1982, incorporated herein by reference). Each amino acid has been assigned a hydropathic index on the basis of its hydrophobicity and charge characteristics (Kyte and Doolittle, 1982). These values are: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is known in the art that certain amino acids may be substituted by other amino acids having a similar hydropathic index or score and still result in a protein with similar biological activity, i.e., still obtain a biological functionally equivalent protein. In making such changes, the substitution of amino acids whose hydropathic indices are within ±2 is preferred, those within ±1 are particularly preferred, and those within ±0.5 are even more particularly preferred. It is also understood in the art that the substitution of like amino acids can be made effectively on the basis of hydrophilicity.

As detailed in U.S. Pat. No. 4,554,101, the following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1);

alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent protein. In such changes, the substitution of amino acids whose hydrophilicity values are within ±2 is preferred, those within ±1 are particularly preferred, and those within ±0.5 are even more particularly preferred.

As outlined above, amino acid substitutions may be based on the relative similarity of the amino acid side-chain substituents, for example, their hydrophobicity, hydrophilicity, charge, size, and the like.

Polypeptide variants further include glycosylated forms, aggregative conjugates with other molecules, and covalent conjugates with unrelated chemical moieties (e.g., pegylated molecules). Covalent variants can be prepared by linking functionalities to groups which are found in the amino acid chain or at the N- or C-terminal residue, as is known in the art. Variants also include allelic variants, species variants, and muteins. Truncations or deletions of regions which do not affect functional activity of the proteins are also variants.

Polypeptides contemplated in particular embodiments include fusion polypeptides. In preferred embodiments, fusion polypeptides and polynucleotides encoding fusion polypeptides are provided, e.g., light chain or heavy chain variable regions linked by a linker sequence.

Fusion polypeptides may optionally comprise a linker that can be used to link the one or more polypeptides or domains within a polypeptide. A peptide linker sequence may be employed to separate any two or more polypeptide components by a distance sufficient to ensure that each polypeptide folds into its appropriate secondary and tertiary structures so as to allow the polypeptide domains to exert their desired functions. Such a peptide linker sequence is incorporated into the fusion polypeptide using standard techniques in the art. Suitable peptide linker sequences may be chosen based on the following factors: (1) their ability to adopt a flexible extended conformation; (2) their inability to adopt a secondary structure that could interact with functional epitopes on the first and second polypeptides; and (3) the lack of hydrophobic or charged residues that might react with the polypeptide functional epitopes. Preferred peptide linker sequences contain Gly, Asn and Ser residues. Other near neutral amino acids, such as Thr and Ala may also be used in the linker sequence. Amino acid sequences which may be usefully employed as linkers include those disclosed in Maratea et al., *Gene* 40:39-46, 1985; Murphy et al., *Proc. Natl. Acad. Sci. USA* 83:8258-8262, 1986; U.S. Pat. Nos. 4,935,233 and 4,751,180. Linker sequences are not required when a particular fusion polypeptide segment contains nonessential N-terminal amino acid regions that can be used to separate the functional domains and prevent steric interference. Preferred linkers are typically flexible amino acid subsequences which are synthesized as part of a recombinant fusion protein. Linker polypeptides can be between 1 and 200 amino acids in length, between 1 and 100 amino acids in length, or between 1 and 50 amino acids in length, including all integer values in between.

Exemplary linkers include, but are not limited to the following amino acid sequences: glycine polymers $(G)_n$; glycine-serine polymers $(G_{1-5}S_{1-5})_n$, where n is an integer of at least one, two, three, four, or five; glycine-alanine polymers; alanine-serine polymers; GGG; DGGGS (SEQ ID NO: 52); TGEKP (SEQ ID NO: 53) (see e.g., Liu et ed., *PNAS* 5525-5530 (1997)); GGRR (SEQ ID NO: 54) (Pomerantz et al. 1995, supra); $(GGGGS)_n$ (SEQ ID NO: 55) (Kim et al., *PNAS* 93, 1156-1160 (1996.); EGKSSGSGSESKVD (SEQ ID NO: 56) (Chaudhary et al., 1990, *Proc. Natl. Acad. Sci. U.S.A.* 87:1066-1070); KESGSVSSEQLAQFRSLD (SEQ ID NO: 57) (Bird et al., 1988, *Science* 242:423-426), GGRRGGGS (SEQ ID NO: 58); LRQRDGERP (SEQ ID NO: 59); LRQKDGGGSERP (SEQ ID NO: 60); LRQKD $(GGGS)_2ERP$ (SEQ ID NO: 61). Alternatively, flexible linkers can be rationally designed using a computer program capable of modeling both DNA-binding sites and the peptides themselves (Desjarlais & Berg, *PNAS* 90:2256-2260 (1993), *PNAS* 91:110911-13103 (1994) or by phage display methods.

Fusion polypeptides are typically linked C-terminus to N-terminus, although they can also be linked C-terminus to C-terminus, N-terminus to N-terminus, or N-terminus to C-terminus. The polypeptides of the fusion protein can be in any order or a specified order. Fusion polypeptides or fusion proteins can also include conservatively modified variants, polymorphic variants, alleles, mutants, subsequences, and interspecies homologs, so long as the desired activity of the fusion polypeptide is preserved. Fusion polypeptides may be produced by chemical synthetic methods or by chemical linkage between the two moieties or may generally be prepared using other standard techniques. Ligated DNA sequences comprising the fusion polypeptide are operably linked to suitable transcriptional or translational control elements as discussed elsewhere herein.

In one embodiment, a fusion partner comprises a sequence that assists in expressing the protein (an expression enhancer) at higher yields than the native recombinant protein. Other fusion partners may be selected so as to increase the solubility of the protein or to enable the protein to be targeted to desired intracellular compartments or to facilitate transport of the fusion protein through the cell membrane.

Fusion polypeptides may further comprise a polypeptide cleavage signal between each of the polypeptide domains described herein. In addition, a polypeptide cleavage site can be put into any linker peptide sequence. Exemplary polypeptide cleavage signals include polypeptide cleavage recognition sites such as protease cleavage sites, nuclease cleavage sites (e.g., rare restriction enzyme recognition sites, self-cleaving ribozyme recognition sites), and self-cleaving viral oligopeptides (see deFelipe and Ryan, 2004. *Traffic*, 5(8); 616-26).

F. Polynucleotides

In preferred embodiments, a polynucleotide encoding an antibody or antigen binding fragment thereof contemplated herein is provided. As used herein, the terms "polynucleotide" or "nucleic acid" refers to messenger RNA (mRNA), RNA, genomic DNA (gDNA), complementary DNA (cDNA) or recombinant DNA. Polynucleotides include single and double stranded polynucleotides. In particular embodiments, polynucleotides include polynucleotides or variants having at least about 50%, 55%, 60%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 86%, 97%, 98%, or 99% sequence identity to any of the reference sequences contemplated herein. In various illustrative embodiments, polynucleotides encoding a polypeptide contemplated herein, including, but not limited to the polypeptide sequences set forth in SEQ ID NOs: 1-40.

In particular embodiments, polynucleotides are provided that encode at least about 5, 10, 25, 50, 100, 150, 200, 250, 300, 350, 400, 500, 1000, 1250, 1500, 1750, or 2000 or more contiguous amino acid residues of a polypeptide, as well as all intermediate lengths. It will be readily understood that "intermediate lengths," in this context, means any length between the quoted values, such as 6, 7, 8, 9, etc., 101, 102, 103, etc.; 151, 152, 153, etc.; 201, 202, 203, etc.

As used herein, the terms "polynucleotide variant" and "variant" and the like refer to polynucleotides displaying substantial sequence identity with a reference polynucleotide sequence or polynucleotides that hybridize with a reference sequence under stringent conditions that are defined hereinafter. These terms include polynucleotides in which one or more nucleotides have been added or deleted or replaced with different nucleotides compared to a reference polynucleotide. In this regard, it is well understood in the art that certain alterations inclusive of mutations, additions, deletions and substitutions can be made to a reference polynucleotide whereby the altered polynucleotide retains the biological function or activity of the reference polynucleotide.

The recitations "sequence identity" or, for example, comprising a "sequence 50% identical to," as used herein, refer to the extent that sequences are identical on a nucleotide-by-nucleotide basis or an amino acid-by-amino acid basis over a window of comparison. Thus, a "percentage of sequence identity" may be calculated by comparing two optimally aligned sequences over the window of comparison, determining the number of positions at which the identical nucleic acid base (e.g., A, T, C, G, I) or the identical amino acid residue (e.g., Ala, Pro, Ser, Thr, Gly, Val, Leu, Ile, Phe, Tyr, Trp, Lys, Arg, His, Asp, Glu, Asn, Gln, Cys and Met) occurs in both sequences to yield the number of matched positions, dividing the number of matched positions by the total number of positions in the window of comparison (i.e., the window size), and multiplying the result by 100 to yield the percentage of sequence identity. Included are nucleotides and polypeptides having at least about 50%, 55%, 60%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 86%, 97%, 98%, or 99% sequence identity to any of the reference sequences described herein, typically where the polypeptide variant maintains at least one biological activity of the reference polypeptide.

Terms used to describe sequence relationships between two or more polynucleotides or polypeptides include "reference sequence," "comparison window," "sequence identity," "percentage of sequence identity," and "substantial identity". A "reference sequence" is at least 12 but frequently 15 to 18 and often at least 25 monomer units, inclusive of nucleotides and amino acid residues, in length. Because two polynucleotides may each comprise (1) a sequence (i.e., only a portion of the complete polynucleotide sequence) that is similar between the two polynucleotides, and (2) a sequence that is divergent between the two polynucleotides, sequence comparisons between two (or more) polynucleotides are typically performed by comparing sequences of the two polynucleotides over a "comparison window" to identify and compare local regions of sequence similarity. A "comparison window" refers to a conceptual segment of at least 6 contiguous positions, usually about 50 to about 100, more usually about 100 to about 150 in which a sequence is compared to a reference sequence of the same number of contiguous positions after the two sequences are optimally aligned. The comparison window may comprise additions or deletions (i.e., gaps) of about 20% or less as compared to the reference sequence (which does not comprise additions or deletions) for optimal alignment of the two sequences. Optimal alignment of sequences for aligning a comparison window may be conducted by computerized implementations of algorithms (GAP, BESTFIT, FASTA, and TFASTA in the Wisconsin Genetics Software Package Release 7.0, Genetics Computer Group, 575 Science Drive Madison, Wis., USA) or by inspection and the best alignment (i.e., resulting in the highest percentage homology over the comparison window) generated by any of the various methods selected. Reference also may be made to the BLAST family of programs as for example disclosed by Altschul et al., 1997, Nucl. Acids Res. 25:3389. A detailed discussion of sequence analysis can be found in Unit 19.3 of Ausubel et al., Current Protocols in Molecular Biology, John Wiley & Sons Inc, 1994-1998, Chapter 15.

As used herein, "isolated polynucleotide" refers to a polynucleotide that has been purified from the sequences which flank it in a naturally-occurring state, e.g., a DNA fragment that has been removed from the sequences that are normally adjacent to the fragment. An "isolated polynucleotide" also refers to a complementary DNA (cDNA), a recombinant DNA, or other polynucleotide that does not exist in nature and that has been made by the hand of man.

Terms that describe the orientation of polynucleotides include: 5' (normally the end of the polynucleotide having a free phosphate group) and 3' (normally the end of the polynucleotide having a free hydroxyl (OH) group). Polynucleotide sequences can be annotated in the 5' to 3' orientation or the 3' to 5' orientation. For DNA and mRNA, the 5' to 3' strand is designated the "sense," "plus," or "coding" strand because its sequence is identical to the sequence of the premessenger (premRNA) [except for uracil (U) in RNA, instead of thymine (T) in DNA]. For DNA and mRNA, the complementary 3' to 5' strand which is the strand transcribed by the RNA polymerase is designated as "template," "antisense," "minus," or "non-coding" strand. As used herein, the term "reverse orientation" refers to a 5' to 3' sequence written in the 3' to 5' orientation or a 3' to 5' sequence written in the 5' to 3' orientation.

The terms "complementary" and "complementarity" refer to polynucleotides (i.e., a sequence of nucleotides) related by the base-pairing rules. For example, the complementary strand of the DNA sequence 5' A G T C A T G 3' is 3' T C A G T A C 5'. The latter sequence is often written as the reverse complement with the 5' end on the left and the 3' end on the right, 5' C A T G A C T 3'. A sequence that is equal to its reverse complement is said to be a palindromic sequence. Complementarity can be "partial," in which only some of the nucleic acids' bases are matched according to the base pairing rules. Or, there can be "complete" or "total" complementarity between the nucleic acids.

Moreover, it will be appreciated by those of ordinary skill in the art that, as a result of the degeneracy of the genetic code, there are many nucleotide sequences that encode a polypeptide, or fragment of variant thereof, as described herein. Some of these polynucleotides bear minimal homology to the nucleotide sequence of any native sequence. Nonetheless, polynucleotides that vary due to differences in codon usage are specifically contemplated in particular embodiments, for example polynucleotides that are optimized for human and/or primate codon selection.

Polynucleotides can be prepared, manipulated and/or expressed using any of a variety of well-established techniques known and available in the art. In order to express a desired polypeptide, a nucleotide sequence encoding the polypeptide, can be inserted into appropriate vector.

G. Sequence Listing

| SEQ ID NO | NAME | SEQUENCE |
|---|---|---|
| 1 | 2K1 LCDR1 | QASESIYDYLS |
| 2 | 2K1 LCDR2 | RVSTLAS |
| 3 | 2K1 LCDR3 | QQAYQYDVINL |
| 4 | 2H1 HCDR1 | GIDLSHYDIN |
| 5 | 2H1 HCDR2 | AIYGSDNTYYARWAKG |
| 6 | 2H1 HCDR3 | DVPGYGAFDAFDS |
| 7 | 2K1 Light Chain Variable Region | MDTRAPTQLLGLLLLWLPGARCADIVMTQTPASVEAAVGGTITIKCQ ASESIYDYLSWYQQKPGQPPKLLIYRVSTLASGVSSRFSASGYGTEF SLTISGVECADAATYYCQQAYQYDVINLFGGGTEVVVK |
| 8 | 2H1 Heavy Chain Variable Region | METGLRWLLLVAVLKGVQCQSLEESGGRLVTPGTPLTLTCTVSGIDL SHYDINWIRQAPGKGLEWVGAIYGSDNTYYARWAKGRVTISKTSTTV ELIMSSPTTEDTATYFCARDVPGYGAFDAFDSWGQGTLVTVSS |
| 9 | 2K1 Light Chain Variable Region | DIVMTQTPASVEAAVGGTITIKCQASESIYDYLSWYQQKPGQPPKLL IYRVSTLASGVSSRFSASGYGTEFSLTISGVECADAATYYCQQAYQY DVINLFGGGTEVVVK |
| 10 | 2H1 Heavy Chain Variable Region | QCQSLEESGGRLVTPGTPLTLTCTVSGIDLSHYDINWIRQAPGKGLE WVGAIYGSDNTYYARWAKGRVTISKTSTTVELIMSSPTTEDTATYFC ARDVPGYGAFDAFDSWGQGTLVTVSS |
| 11 | 3K1 LCDR1 | QSSQSVYTNNDLA |
| 12 | 3K1 LCDR2 | RASRLAS |
| 13 | 3K1 LCDR3 | LGGYDDDADNA |
| 14 | 3H3 HCDR1 | GIDLNINNVA |
| 15 | 3H3 HCDR2 | WLSSSGSTYYAIWAKG |
| 16 | 3H3 HCDR3 | GPGWDTGILFNL |
| 17 | 3K1 Light Chain Variable Region | MDTRAPTQLLGLLLLWLPGATFAAVLTQTPSPVSAAVGGTVTISCQS SQSVYTNNDLAWYQQKPGQPPKVLIYRASRLASGVPSRFSGSGSGTQ FSLTISGVQCDDAATYYCLGGYDDDADNAFGGGTEVWK |
| 18 | 3H3 Heavy Chain Variable Region | METGLRWLLLVAVLKGVQCQSVEESGGRLVTPGTPLTLTCTVSGIDL NINNVAWVRQSPGEGLEYIGWLSSSGSTYYAIWAKGRFIISKTSSTT VDLKMPSLTTEDTATYFCARGPGWDTGILFNLWGQGTLVTVSS |
| 19 | 3K1 Light Chain Variable Region | AAVLTQTPSPVSAAVGGTVTISCQSSQSVYTNNDLAWYQQKPGQPPK VLIYRASRLASGVPSRFSGSGSGTQFSLTISGVQCDDAATYYCLGGY DDDADNAFGGGTEVVVK |
| 20 | 3H3 Heavy Chain Variable Region | QCQSVEESGGRLVTPGTPLTLTCTVSGIDLNINNVAWVRQSPGEGLE YIGWLSSSGSTYYAIWAKGRFIISKTSSTTVDLKMPSLTTEDTATYF CARGPGWDTGILFNLWGQGTLVTVSS |
| 21 | 5K1 LCDR1 | QASQSIRTALA |
| 22 | 5K1 LCDR2 | DTSDLAS |
| 23 | 5K1 LCDR3 | QSYSYSGSRNYV |

| SEQ ID NO | NAME | SEQUENCE |
|---|---|---|
| 24 | 5H1 HCDR1 | GLDFSSYWLC |
| 25 | 5H1 HCDR2 | CIYTGSSPYIDYASWAKG |
| 26 | 5H1 HCDR3 | VGYGEITYFGL |
| 27 | 5K1 Light Chain Variable Region | MDTRAPTQLLGLLLLWLPGARCGDVVMTQTPASVEAAVGGTVTIKCQASQSIRTALAWYQQKPGQPPKLLISDTSDLASGVPSRFSGSGSGTEFTLTISGVQCEDAATYYCQSYSYSGSRNYVFGGGTEVVVK |
| 28 | 5H1 Heavy Chain Variable Region | METGLRWLLLVAVLKGVQCQEQLVESGGGLVQPEGSLTLTCKGSGLDFSSYWLCWVRQAPGKGLEWIACIYTGSSPYIDYASWAKGRFTISKTSSTSVTLQMTSLTVADTATYFCARVGYGEITYFGLWGQGTLVTVSS |
| 29 | 5K1 Light Chain Variable Region | DVVMTQTPASVEAAVGGTVTIKCQASQSIRTALAWYQQKPGQPPKLLISDTSDLASGVPSRFSGSGSGTEFTLTISGVQCEDAATYYCQSYSYSGSRNYVFGGGTEVVVK |
| 30 | 5H1 Heavy Chain Variable Region | QCQEQLVESGGGLVQPEGSLTLTCKGSGLDFSSYWLCWVRQAPGKGLEWIACIYTGSSPYIDYASWAKGRFTISKTSSTSVTLQMTSLTVADTATYFCARVGYGEITYFGLWGQGTLVTVSS |
| 31 | 6K3 LCDR1 | QSSESVYSNYLS |
| 32 | 6K3 LCDR2 | DASYLAS |
| 33 | 6K3 LCDR3 | AGYYSGVIYA |
| 34 | 6H2 HCDR1 | GFSFSTSYWIY |
| 35 | 6H2 HCDR2 | HIHTGTDNTYYATWAEG |
| 36 | 6H2 HCDR3 | DLLYDNSHL |
| 37 | 6K3 Light Chain Variable Region | MDTRAPTQLLGLLLLWLPGATFAQVLTQTPSPVSVAVGGTVTINCQSSESVYSNYLSWYQQKPGQPPKVLIYDASYLASGVPSRFKGSGSGTQFTLTISDMLCDDAATYYCAGYYSGVIYAFGGGTEVVVK |
| 38 | 6H2 Heavy Chain Variable Region | METGLRWLLLVAVLKGVQCQSLEESGGDLVKPGASLTLTCTASGFSFSTSYWIYWVRQAPGKGLEWIAHIHTGTDNTYYATWAEGRFTISKASSTTVTLQVTSLTAADTATYFCARDLLYDNSHLWGQGTLVTVSS |
| 39 | 6K3 Light Chain Variable Region | AQVLTQTPSPVSVAVGGTVTINCQSSESVYSNYLSWYQQKPGQPPKVLIYDASYLASGVPSRFKGSGSGTQFTLTISDMLCDDAATYYCAGYYSGVIYAFGGGTEVVVK |
| 40 | 6H2 Heavy Chain Variable Region | QCQSLEESGGDLVKPGASLTLTCTASGFSFSTSYWIYWVRQAPGKGLEWIAHIHTGTDNTYYATWAEGRFTISKASSTTVTLQVTSLTAADTATYFCARDLLYDNSHLWGQGTLVTVSS |
| 41 | 9K3 LCDR1 | QSSQSVYVNNDLA |
| 42 | 9K3 LCDR2 | RASKLAS |
| 43 | 9K3 LCDR3 | LGGYDDDAHNA |
| 44 | 9H2 HCDR1 | GIDLSSNNMA |
| 45 | 9H2 HCDR2 | WISSSGSTYYASWAKG |
| 46 | 9H2 HCDR3 | GPGWDTGILFSL |
| 47 | 9K3 Light Chain Variable Region | MDTRAPTQLLGLLLLWLPGATFAAVLTQTPSPVSAAVGGTVTISCQSSQSVYVNNDLAWYQQKPGQPPKLLIYRASKLASGVTSRFSGSGSGTQFTLTISGVQCDDAATYYCLGGYDDDAHNAFGGGTEVVVK |

| SEQ ID NO | NAME | SEQUENCE |
|---|---|---|
| 48 | 9H2 Heavy Chain Variable Region | METGLRWLLLVAVLKGVQCQSVEESGGRLVTPGTPLTLTCTVSGIDL SSNNMAWVRQSPGEGLEYIGWISSSGSTYYASWAKGRFTISKASSTT VDLKMTSLTPEDTATYFCARGPGWDTGILFSLWGQGTLVTVSS |
| 49 | 9K3 Light Chain Variable Region | AAVLTQTPSPVSAAVGGTVTISCQSSQSVYVNNDLAWYQQKPGQPPK LLIYRASKLASGVTSRFSGSGSGTQFTLTISGVQCDDAATYYCLGGY DDDAHNAFGGGTEVVVK |
| 50 | 9H2 Heavy Chain Variable Region | QCQSVEESGGRLVTPGTPLTLTCTVSGIDLSSNNMAWVRQSPGEGLE YIGWISSSGSTYYASWAKGRFTISKASSTTVDLKMTSLTPEDTATYF CARGPGWDTGILFSLWGQGTLVTVSS |
| 51 | FRB polypeptide | GSILWHEMWHEGLEEASRLYFGERNVKGMFEVLEPLHAMMERGPQTL KETSFNQAYGRDLMEAQEWCRKYMKSGNVKDLLQAWDLYYHVFRRIS KAS |

All publications, patent applications, and issued patents cited in this specification are herein incorporated by reference as if each individual publication, patent application, or issued patent were specifically and individually indicated to be incorporated by reference.

Although the foregoing embodiments have been described in some detail by way of illustration and example for purposes of clarity of understanding, it will be readily apparent to one of ordinary skill in the art in light of the teachings contemplated herein that certain changes and modifications may be made thereto without departing from the spirit or scope of the appended claims. The following examples are provided by way of illustration only and not by way of limitation. Those of skill in the art will readily recognize a variety of noncritical parameters that could be changed or modified to yield essentially similar results.

EXAMPLES

Example 1

Anti-Rabbit Monoclonal Antibody Production

Recombinant FRB (SEQ ID NO: 51) was conjugated to rabbit Fc and used to immunize rabbits. Antibody sequences were isolated from primary rabbit B cells and expressed recombinantly. FIG. 1.

Briefly, recombinant anti-FRB antibodies were produced via transient transfection of EXPI 293 cells in EXPI 293 media. Each 150 mL transient transfection was performed by complexing expression plasmid with PEI Pro. Expi 293 cells were transfected at a cell density of $3 \times 10^6$ cells/mL. After 96 hours, the cell supernatant was collected and 0.22 µM filtered. The secreted recombinant protein was purified from the cell supernatant by MAb Select Prisma affinity chromatography on an AKTA Pure. After MAb Select Prisma purification, recombinant antibody quality and purity were assessed via SDS Page electrophoresis. Each antibody was >95% purity after MAb Select Prisma purification.

Example 2

Anti-Frb Monoclonal Antibodies

Peripheral blood mononuclear cells (PBMCs) were activated using CD3 and CD28 antibodies and transduced with a lentiviral vector encoding a chimeric protein the extracellular expresses an FRB domain and cultured for T cell expansion.

50,000 untransduced (UTD) T cells and T cells transduced to express FRB were washed in 200 µL of PBS and then resuspended in 20 µL of PBS and 16 µg/mL, 8 µg/mL, 4 µg/mL, 1.6 µg/mL, 0.8 µg/mL, or 0.4 µg/mL of each antibody and incubated at room temp for 30 min. Cells were then diluted and washed in PBS and resuspended in 20 µL PBS+1:500 Goat Anti-Rabbit IgG (AF647) (Invitrogen A-21246). Cells were incubated for an additional 30 min. After incubation, the cells were diluted and washed in PBS and resuspended in 200 µL PBS. Cells were analyzed via the Attune Cytometer in the APC channel. Data for each antibody clone is shown in FIGS. 2A-2E.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An anti-FKBP Rapamycin binding (FRB) antibody or antigen binding fragment thereof that binds an FRB polypeptide, wherein the antibody or antigen binding fragment thereof comprises a light chain variable region comprising the light chain CDRs (CDRL1-CDRL3) set forth in any one of SEQ ID NOs: 1-3, 11-13, 21-23, 31-33, and 41-43 and a heavy chain variable region comprising the heavy chain CDRs (CDRH1-CDRH3) set forth in any one of SEQ ID NOs: 4-6, 14-16, 24-26, 34-36, and 44-46.

2. The anti-FRB antibody or antigen binding fragment thereof of claim 1, wherein the antibody or antigen binding fragment thereof comprises a light chain variable region comprising the light chain CDRs (CDRL1-CDRL3) set forth in SEQ ID NOs: 1-3 and the heavy chain variable region comprising the heavy chain CDRs (CDRH1-CDRH3) set forth in SEQ ID NOs: 4-6.

3. The anti-FRB antibody or antigen binding fragment thereof of claim 1, wherein the antibody or antigen binding fragment thereof comprises a light chain variable region comprising the light chain CDRs (CDRL1-CDRL3) set forth in SEQ ID NOs: 11-13 and the heavy chain variable region comprising the heavy chain CDRs (CDRH1-CDRH3) set forth in SEQ ID NOs: 14-16.

4. The anti-FRB antibody or antigen binding fragment thereof of claim 1, wherein the antibody or antigen binding fragment thereof comprises a light chain variable region comprising the light chain CDRs (CDRL1-CDRL3) set forth in SEQ ID NOs: 21-23 and the heavy chain variable region comprising the heavy chain CDRs (CDRH1-CDRH3) set forth in SEQ ID NOs: 24-26.

5. The anti-FRB antibody or antigen binding fragment thereof of claim 1, wherein the antibody or antigen binding fragment thereof comprises a light chain variable region comprising the light chain CDRs (CDRL1-CDRL3) set forth in SEQ ID NOs: 31-33 and the heavy chain variable region comprising the heavy chain CDRs (CDRH1-CDRH3) set forth in SEQ ID NOs: 34-36.

6. The anti-FRB antibody or antigen binding fragment thereof of claim 1, wherein the antibody or antigen binding fragment thereof comprises a light chain variable region comprising the light chain CDRs (CDRL1-CDRL3) set forth in SEQ ID NOs: 41-43 and the heavy chain variable region comprising the heavy chain CDRs (CDRH1-CDRH3) set forth in SEQ ID NOs: 44-46.

7. The anti-FRB antibody or antigen binding fragment thereof of claim 1, wherein the antibody or antigen binding fragment thereof comprises a variable light chain sequence as set forth in any one of SEQ ID NOs: 7, 9, 17, 19, 27, 29, 37, 39, 47, and 49 and a variable heavy chain sequence as set forth in any one of SEQ ID NOs: 8, 10, 18, 20, 28, 30, 38, 40, 48, and 50.

8. The anti-FRB antibody or antigen binding fragment thereof of claim 1, wherein the antibody or antigen binding fragment thereof comprises a variable light chain sequence as set forth in SEQ ID NO: 7 or SEQ ID NO: 9 and a variable heavy chain sequence as set forth in SEQ ID NO: 8 or SEQ ID NO: 10.

9. The anti-FRB antibody or antigen binding fragment thereof of claim 1, wherein the antibody or antigen binding fragment thereof comprises a variable light chain sequence as set forth in SEQ ID NO: 17 or SEQ ID NO: 18 and a variable heavy chain sequence as set forth in SEQ ID NO: 19 or SEQ ID NO: 20.

10. The anti-FRB antibody or antigen binding fragment thereof of claim 1, wherein the antibody or antigen binding fragment thereof comprises a variable light chain sequence as set forth in SEQ ID NO: 27 or SEQ ID NO: 28 and a variable heavy chain sequence as set forth in SEQ ID NO: 29 or SEQ ID NO: 30.

11. The anti-FRB antibody or antigen binding fragment thereof of claim 1, wherein the antibody or antigen binding fragment thereof comprises a variable light chain sequence as set forth in SEQ ID NO: 37 or SEQ ID NO: 38 and a variable heavy chain sequence as set forth in SEQ ID NO: 39 or SEQ ID NO: 40.

12. The anti-FRB antibody or antigen binding fragment thereof of claim 1, wherein the antibody or antigen binding fragment thereof comprises a variable light chain sequence as set forth in SEQ ID NO: 47 or SEQ ID NO: 48 and a variable heavy chain sequence as set forth in SEQ ID NO: 49 or SEQ ID NO: 50.

13. The anti-FRB antibody or antigen binding fragment thereof of claim 1, wherein (i) the antibody or antigen binding fragment comprises a variable heavy chain sequence, a polypeptide linker, and a variable light chain sequence or (ii) the antibody or antigen binding fragment comprises a variable light chain sequence, a polypeptide linker, and a variable heavy chain sequence.

14. The anti-FRB antibody or antigen binding fragment thereof of claim 1, wherein the antibody or antigen binding fragment is a monoclonal antibody or antigen binding fragment.

15. The anti-FRB antibody or antigen binding fragment thereof of claim 1, wherein the antibody or antigen binding fragment is a single chain variable fragment (scFv).

16. The anti-FRB antibody or antigen binding fragment thereof of claim 1, wherein the antibody or antigen binding fragment binds an FRB polypeptide sequence set forth in SEQ ID NO: 51.

17. A conjugate, comprising the anti-FRB antibody or antigen binding fragment thereof of claim 1 and a detectable label.

18. A polynucleotide encoding the anti-FRB antibody or antigen binding fragment thereof of claim 1.

19. A composition comprising the anti-FRB antibody or antigen binding fragment of claim 1.

20. A hybridoma comprising (i) the anti-FRB antibody or antigen binding fragment thereof of claim 1, or (ii) one or more polynucleotides encoding the anti-FRB antibody or antigen binding fragment thereof of claim 1.

* * * * *

SEQUENCE LISTING

<160> NUMBER OF SEQ ID NOS: 65

<210> SEQ ID NO 1
<211> LENGTH: 11
<212> TYPE: PRT
<213> ORGANISM: Artificial Sequence
<220> FEATURE:
<223> OTHER INFORMATION: Made in Lab - 2K1 light chain CDR1 sequence

<400> SEQUENCE: 1

Gln Ala Ser Glu Ser Ile Tyr Asp Tyr Leu Ser
1               5                   10

<210> SEQ ID NO 2
<211> LENGTH: 7
<212> TYPE: PRT
<213> ORGANISM: Artificial Sequence
<220> FEATURE:
<223> OTHER INFORMATION: Made in Lab - 2K1 light chain CDR2 sequence

<400> SEQUENCE: 2

Arg Val Ser Thr Leu Ala Ser
1               5

<210> SEQ ID NO 3
<211> LENGTH: 11
<212> TYPE: PRT
<213> ORGANISM: Artificial Sequence
<220> FEATURE:
<223> OTHER INFORMATION: Made in Lab - 2K1 light chain CDR3 sequence

<400> SEQUENCE: 3

Gln Gln Ala Tyr Gln Tyr Asp Val Ile Asn Leu
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Made in Lab - 2H1 heavy chain CDR1 sequence

<400> SEQUENCE: 4

Gly Ile Asp Leu Ser His Tyr Asp Ile Asn
1               5                   10

<210> SEQ ID NO 5
<211> LENGTH: 16
<212> TYPE: PRT
<213> ORGANISM: Artificial Sequence
<220> FEATURE:
<223> OTHER INFORMATION: Made in Lab - 2H1 heavy chain CDR2 sequence

<400> SEQUENCE: 5

Ala Ile Tyr Gly Ser Asp Asn Thr Tyr Tyr Ala Arg Trp Ala Lys Gly
1               5                   10                  15

<210> SEQ ID NO 6
<211> LENGTH: 13
<212> TYPE: PRT
<213> ORGANISM: Artificial Sequence
<220> FEATURE:
<223> OTHER INFORMATION: Made in Lab - 2H1 heavy chain CDR3 sequence

<400> SEQUENCE: 6

Asp Val Pro Gly Tyr Gly Ala Phe Asp Ala Phe Asp Ser
1               5                   10

<210> SEQ ID NO 7
<211> LENGTH: 132
<212> TYPE: PRT
<213> ORGANISM: Artificial Sequence
<220> FEATURE:
<223> OTHER INFORMATION: Made in Lab - 2K1 Light Chain Variable Region

<400> SEQUENCE: 7

Met Asp Thr Arg Ala Pro Thr Gln Leu Leu Gly Leu Leu Leu Leu Trp
1               5                   10                  15

Leu Pro Gly Ala Arg Cys Ala Asp Ile Val Met Thr Gln Thr Pro Ala
                20                  25                  30

Ser Val Glu Ala Ala Val Gly Thr Ile Thr Ile Lys Cys Gln Ala
            35                  40                  45

Ser Glu Ser Ile Tyr Asp Tyr Leu Ser Trp Tyr Gln Gln Lys Pro Gly
        50                  55                  60

Gln Pro Pro Lys Leu Leu Ile Tyr Arg Val Ser Thr Leu Ala Ser Gly
65                  70                  75                  80

Val Ser Ser Arg Phe Ser Ala Ser Gly Tyr Gly Thr Glu Phe Ser Leu
                85                  90                  95

Thr Ile Ser Gly Val Glu Cys Ala Asp Ala Ala Thr Tyr Tyr Cys Gln
            100                 105                 110

Gln Ala Tyr Gln Tyr Asp Val Ile Asn Leu Phe Gly Gly Gly Thr Glu
        115                 120                 125

Val Val Val Lys
    130

<210> SEQ ID NO 8
<211> LENGTH: 137
<212> TYPE: PRT
<213> ORGANISM: Artificial Sequence
<220> FEATURE:
<223> OTHER INFORMATION: Made in Lab - 2H1 Heavy Chain Variable Region

<400> SEQUENCE: 8

Met Glu Thr Gly Leu Arg Trp Leu Leu Leu Val Ala Val Leu Lys Gly
1               5                   10                  15

Val Gln Cys Gln Ser Leu Glu Glu Ser Gly Gly Arg Leu Val Thr Pro
                20                  25                  30

Gly Thr Pro Leu Thr Leu Thr Cys Thr Val Ser Gly Ile Asp Leu Ser
            35                  40                  45

His Tyr Asp Ile Asn Trp Ile Arg Gln Ala Pro Gly Lys Gly Leu Glu
        50                  55                  60

Trp Val Gly Ala Ile Tyr Gly Ser Asp Asn Thr Tyr Tyr Ala Arg Trp
65                  70                  75                  80

Ala Lys Gly Arg Val Thr Ile Ser Lys Thr Ser Thr Thr Val Glu Leu
                85                  90                  95

Ile Met Ser Ser Pro Thr Thr Glu Asp Thr Ala Thr Tyr Phe Cys Ala
            100                 105                 110

Arg Asp Val Pro Gly Tyr Gly Ala Phe Asp Ala Phe Asp Ser Trp Gly
        115                 120                 125

Gln Gly Thr Leu Val Thr Val Ser Ser
130                 135

<210> SEQ ID NO 9
<211> LENGTH: 109
<212> TYPE: PRT
<213> ORGANISM: Artificial Sequence
<220> FEATURE:
<223> OTHER INFORMATION: Made in Lab - 2K1 Light Chain Variable Region

<400> SEQUENCE: 9

Asp Ile Val Met Thr Gln Thr Pro Ala Ser Val Glu Ala Ala Val Gly
1               5                   10                  15

```
Gly Thr Ile Thr Ile Lys Cys Gln Ala Ser Glu Ser Ile Tyr Asp Tyr
            20                  25                  30

Leu Ser Trp Tyr Gln Gln Lys Pro Gly Gln Pro Pro Lys Leu Leu Ile
        35                  40                  45

Tyr Arg Val Ser Thr Leu Ala Ser Gly Val Ser Ser Arg Phe Ser Ala
50                  55                  60

Ser Gly Tyr Gly Thr Glu Phe Ser Leu Thr Ile Ser Gly Val Glu Cys
65                  70                  75                  80

Ala Asp Ala Ala Thr Tyr Tyr Cys Gln Gln Ala Tyr Gln Tyr Asp Val
                85                  90                  95

Ile Asn Leu Phe Gly Gly Gly Thr Glu Val Val Val Lys
            100                 105

<210> SEQ ID NO 10
<211> LENGTH: 120
<212> TYPE: PRT
<213> ORGANISM: Artificial Sequence
<220> FEATURE:
<223> OTHER INFORMATION: Made in Lab - 2H1 Heavy Chain Variable Region

<400> SEQUENCE: 10

Gln Cys Gln Ser Leu Glu Glu Ser Gly Gly Arg Leu Val Thr Pro Gly
1               5                   10                  15

Thr Pro Leu Thr Leu Thr Cys Thr Val Ser Gly Ile Asp Leu Ser His
            20                  25                  30

Tyr Asp Ile Asn Trp Ile Arg Gln Ala Pro Gly Lys Gly Leu Glu Trp
        35                  40                  45

Val Gly Ala Ile Tyr Gly Ser Asp Asn Thr Tyr Tyr Ala Arg Trp Ala
50                  55                  60

Lys Gly Arg Val Thr Ile Ser Lys Thr Ser Thr Thr Val Glu Leu Ile
65                  70                  75                  80

Met Ser Ser Pro Thr Thr Glu Asp Thr Ala Thr Tyr Phe Cys Ala Arg
                85                  90                  95

Asp Val Pro Gly Tyr Gly Ala Phe Asp Ala Phe Asp Ser Trp Gly Gln
            100                 105                 110

Gly Thr Leu Val Thr Val Ser Ser
        115                 120

<210> SEQ ID NO 11
<211> LENGTH: 13
<212> TYPE: PRT
<213> ORGANISM: Artificial Sequence
<220> FEATURE:
<223> OTHER INFORMATION: Made in Lab - 3K1 light chain CDR1 sequence

<400> SEQUENCE: 11

Gln Ser Ser Gln Ser Val Tyr Thr Asn Asn Asp Leu Ala
1               5                   10

<210> SEQ ID NO 12
<211> LENGTH: 7
<212> TYPE: PRT
<213> ORGANISM: Artificial Sequence
<220> FEATURE:
<223> OTHER INFORMATION: Made in Lab - 3K1 light chain CDR2 sequence

<400> SEQUENCE: 12

Arg Ala Ser Arg Leu Ala Ser
1               5
```

```
<210> SEQ ID NO 13
<211> LENGTH: 11
<212> TYPE: PRT
<213> ORGANISM: Artificial Sequence
<220> FEATURE:
<223> OTHER INFORMATION: Made in Lab - 3K1 light chain CDR3 sequence

<400> SEQUENCE: 13

Leu Gly Gly Tyr Asp Asp Asp Ala Asp Asn Ala
1               5                   10

<210> SEQ ID NO 14
<211> LENGTH: 10
<212> TYPE: PRT
<213> ORGANISM: Artificial Sequence
<220> FEATURE:
<223> OTHER INFORMATION: Made in Lab - 3H3 heavy chain CDR1 sequence

<400> SEQUENCE: 14

Gly Ile Asp Leu Asn Ile Asn Asn Val Ala
1               5                   10

<210> SEQ ID NO 15
<211> LENGTH: 16
<212> TYPE: PRT
<213> ORGANISM: Artificial Sequence
<220> FEATURE:
<223> OTHER INFORMATION: Made in Lab - 3H3 heavy chain CDR2 sequence

<400> SEQUENCE: 15

Trp Leu Ser Ser Ser Gly Ser Thr Tyr Tyr Ala Ile Trp Ala Lys Gly
1               5                   10                  15

<210> SEQ ID NO 16
<211> LENGTH: 12
<212> TYPE: PRT
<213> ORGANISM: Artificial Sequence
<220> FEATURE:
<223> OTHER INFORMATION: Made in Lab - 3H3 heavy chain CDR3 sequence

<400> SEQUENCE: 16

Gly Pro Gly Trp Asp Thr Gly Ile Leu Phe Asn Leu
1               5                   10

<210> SEQ ID NO 17
<211> LENGTH: 133
<212> TYPE: PRT
<213> ORGANISM: Artificial Sequence
<220> FEATURE:
<223> OTHER INFORMATION: Made in Lab - 3K1 Light Chain Variable Region

<400> SEQUENCE: 17

Met Asp Thr Arg Ala Pro Thr Gln Leu Leu Gly Leu Leu Leu Leu Trp
1               5                   10                  15

Leu Pro Gly Ala Thr Phe Ala Ala Val Leu Thr Gln Thr Pro Ser Pro
            20                  25                  30

Val Ser Ala Ala Val Gly Gly Thr Val Thr Ile Ser Cys Gln Ser Ser
        35                  40                  45

Gln Ser Val Tyr Thr Asn Asn Asp Leu Ala Trp Tyr Gln Gln Lys Pro
    50                  55                  60

Gly Gln Pro Pro Lys Val Leu Ile Tyr Arg Ala Ser Arg Leu Ala Ser
65                  70                  75                  80

Gly Val Pro Ser Arg Phe Ser Gly Ser Gly Ser Gly Thr Gln Phe Ser
                85                  90                  95
```

Leu Thr Ile Ser Gly Val Gln Cys Asp Asp Ala Ala Thr Tyr Tyr Cys
            100                 105                 110

Leu Gly Gly Tyr Asp Asp Ala Asp Asn Ala Phe Gly Gly Gly Thr
        115                 120                 125

Glu Val Val Val Lys
        130

<210> SEQ ID NO 18
<211> LENGTH: 137
<212> TYPE: PRT
<213> ORGANISM: Artificial Sequence
<220> FEATURE:
<223> OTHER INFORMATION: Made in Lab - 3H3 Heavy Chain Variable Region

<400> SEQUENCE: 18

Met Glu Thr Gly Leu Arg Trp Leu Leu Leu Val Ala Val Leu Lys Gly
1               5                   10                  15

Val Gln Cys Gln Ser Val Glu Glu Ser Gly Gly Arg Leu Val Thr Pro
            20                  25                  30

Gly Thr Pro Leu Thr Leu Thr Cys Thr Val Ser Gly Ile Asp Leu Asn
        35                  40                  45

Ile Asn Asn Val Ala Trp Val Arg Gln Ser Pro Gly Glu Gly Leu Glu
50                  55                  60

Tyr Ile Gly Trp Leu Ser Ser Ser Gly Ser Thr Tyr Tyr Ala Ile Trp
65                  70                  75                  80

Ala Lys Gly Arg Phe Ile Ile Ser Lys Thr Ser Ser Thr Thr Val Asp
                85                  90                  95

Leu Lys Met Pro Ser Leu Thr Thr Glu Asp Thr Ala Thr Tyr Phe Cys
            100                 105                 110

Ala Arg Gly Pro Gly Trp Asp Thr Gly Ile Leu Phe Asn Leu Trp Gly
        115                 120                 125

Gln Gly Thr Leu Val Thr Val Ser Ser
        130                 135

<210> SEQ ID NO 19
<211> LENGTH: 111
<212> TYPE: PRT
<213> ORGANISM: Artificial Sequence
<220> FEATURE:
<223> OTHER INFORMATION: Made in Lab - 3K1 Light Chain Variable Region

<400> SEQUENCE: 19

Ala Ala Val Leu Thr Gln Thr Pro Ser Pro Val Ser Ala Ala Val Gly
1               5                   10                  15

Gly Thr Val Thr Ile Ser Cys Gln Ser Ser Gln Ser Val Tyr Thr Asn
            20                  25                  30

Asn Asp Leu Ala Trp Tyr Gln Gln Lys Pro Gly Gln Pro Pro Lys Val
        35                  40                  45

Leu Ile Tyr Arg Ala Ser Arg Leu Ala Ser Gly Val Pro Ser Arg Phe
50                  55                  60

Ser Gly Ser Gly Ser Gly Thr Gln Phe Ser Leu Thr Ile Ser Gly Val
65                  70                  75                  80

Gln Cys Asp Asp Ala Ala Thr Tyr Tyr Cys Leu Gly Gly Tyr Asp Asp
                85                  90                  95

Asp Ala Asp Asn Ala Phe Gly Gly Gly Thr Glu Val Val Val Lys
            100                 105                 110

<210> SEQ ID NO 20

```
<211> LENGTH: 120
<212> TYPE: PRT
<213> ORGANISM: Artificial Sequence
<220> FEATURE:
<223> OTHER INFORMATION: Made in Lab - 3H3 Heavy Chain Variable Region

<400> SEQUENCE: 20

Gln Cys Gln Ser Val Glu Glu Ser Gly Gly Arg Leu Val Thr Pro Gly
1               5                   10                  15

Thr Pro Leu Thr Leu Thr Cys Thr Val Ser Gly Ile Asp Leu Asn Ile
            20                  25                  30

Asn Asn Val Ala Trp Val Arg Gln Ser Pro Gly Glu Gly Leu Glu Tyr
        35                  40                  45

Ile Gly Trp Leu Ser Ser Ser Gly Ser Thr Tyr Tyr Ala Ile Trp Ala
    50                  55                  60

Lys Gly Arg Phe Ile Ile Ser Lys Thr Ser Ser Thr Thr Val Asp Leu
65                  70                  75                  80

Lys Met Pro Ser Leu Thr Thr Glu Asp Thr Ala Thr Tyr Phe Cys Ala
                85                  90                  95

Arg Gly Pro Gly Trp Asp Thr Gly Ile Leu Phe Asn Leu Trp Gly Gln
            100                 105                 110

Gly Thr Leu Val Thr Val Ser Ser
        115                 120

<210> SEQ ID NO 21
<211> LENGTH: 11
<212> TYPE: PRT
<213> ORGANISM: Artificial Sequence
<220> FEATURE:
<223> OTHER INFORMATION: Made in Lab - 5K1 light chain CDR1 sequence

<400> SEQUENCE: 21

Gln Ala Ser Gln Ser Ile Arg Thr Ala Leu Ala
1               5                   10

<210> SEQ ID NO 22
<211> LENGTH: 7
<212> TYPE: PRT
<213> ORGANISM: Artificial Sequence
<220> FEATURE:
<223> OTHER INFORMATION: Made in Lab - 5K1 light chain CDR2 sequence

<400> SEQUENCE: 22

Asp Thr Ser Asp Leu Ala Ser
1               5

<210> SEQ ID NO 23
<211> LENGTH: 12
<212> TYPE: PRT
<213> ORGANISM: Artificial Sequence
<220> FEATURE:
<223> OTHER INFORMATION: Made in Lab - 5K1 light chain CDR3 sequence

<400> SEQUENCE: 23

Gln Ser Tyr Ser Tyr Ser Gly Ser Arg Asn Tyr Val
1               5                   10

<210> SEQ ID NO 24
<211> LENGTH: 10
<212> TYPE: PRT
<213> ORGANISM: Artificial Sequence
<220> FEATURE:
<223> OTHER INFORMATION: Made in Lab - 5H1 heavy chain CDR1 sequence
```

```
<400> SEQUENCE: 24

Gly Leu Asp Phe Ser Ser Tyr Trp Leu Cys
1               5                   10

<210> SEQ ID NO 25
<211> LENGTH: 18
<212> TYPE: PRT
<213> ORGANISM: Artificial Sequence
<220> FEATURE:
<223> OTHER INFORMATION: Made in Lab - 5H1 heavy chain CDR2 sequence

<400> SEQUENCE: 25

Cys Ile Tyr Thr Gly Ser Ser Pro Tyr Ile Asp Tyr Ala Ser Trp Ala
1               5                   10                  15

Lys Gly

<210> SEQ ID NO 26
<211> LENGTH: 11
<212> TYPE: PRT
<213> ORGANISM: Artificial Sequence
<220> FEATURE:
<223> OTHER INFORMATION: Made in Lab - 5H1 heavy chain CDR3 sequence

<400> SEQUENCE: 26

Val Gly Tyr Gly Glu Ile Thr Tyr Phe Gly Leu
1               5                   10

<210> SEQ ID NO 27
<211> LENGTH: 133
<212> TYPE: PRT
<213> ORGANISM: Artificial Sequence
<220> FEATURE:
<223> OTHER INFORMATION: Made in Lab - 5K1 Light Chain Variable Region

<400> SEQUENCE: 27

Met Asp Thr Arg Ala Pro Thr Gln Leu Leu Gly Leu Leu Leu Leu Trp
1               5                   10                  15

Leu Pro Gly Ala Arg Cys Gly Asp Val Val Met Thr Gln Thr Pro Ala
                20                  25                  30

Ser Val Glu Ala Ala Val Gly Gly Thr Val Thr Ile Lys Cys Gln Ala
            35                  40                  45

Ser Gln Ser Ile Arg Thr Ala Leu Ala Trp Tyr Gln Gln Lys Pro Gly
        50                  55                  60

Gln Pro Pro Lys Leu Leu Ile Ser Asp Thr Ser Asp Leu Ala Ser Gly
65                  70                  75                  80

Val Pro Ser Arg Phe Ser Gly Ser Gly Ser Gly Thr Glu Phe Thr Leu
                85                  90                  95

Thr Ile Ser Gly Val Gln Cys Glu Asp Ala Ala Thr Tyr Tyr Cys Gln
            100                 105                 110

Ser Tyr Ser Tyr Ser Gly Ser Arg Asn Tyr Val Phe Gly Gly Gly Thr
        115                 120                 125

Glu Val Val Val Lys
    130

<210> SEQ ID NO 28
<211> LENGTH: 139
<212> TYPE: PRT
<213> ORGANISM: Artificial Sequence
<220> FEATURE:
<223> OTHER INFORMATION: Made in Lab - 5H1 Heavy Chain Variable Region

<400> SEQUENCE: 28
```

```
Met Glu Thr Gly Leu Arg Trp Leu Leu Leu Val Ala Val Leu Lys Gly
1               5                   10                  15

Val Gln Cys Gln Glu Gln Leu Val Glu Ser Gly Gly Gly Leu Val Gln
            20                  25                  30

Pro Glu Gly Ser Leu Thr Leu Thr Cys Lys Gly Ser Gly Leu Asp Phe
        35                  40                  45

Ser Ser Tyr Trp Leu Cys Trp Val Arg Gln Ala Pro Gly Lys Gly Leu
    50                  55                  60

Glu Trp Ile Ala Cys Ile Tyr Thr Gly Ser Ser Pro Tyr Ile Asp Tyr
65              70                  75                  80

Ala Ser Trp Ala Lys Gly Arg Phe Thr Ile Ser Lys Thr Ser Ser Thr
                85                  90                  95

Ser Val Thr Leu Gln Met Thr Ser Leu Thr Val Ala Asp Thr Ala Thr
            100                 105                 110

Tyr Phe Cys Ala Arg Val Gly Tyr Gly Glu Ile Thr Tyr Phe Gly Leu
        115                 120                 125

Trp Gly Gln Gly Thr Leu Val Thr Val Ser Ser
        130                 135
```

<210> SEQ ID NO 29
<211> LENGTH: 110
<212> TYPE: PRT
<213> ORGANISM: Artificial Sequence
<220> FEATURE:
<223> OTHER INFORMATION: Made in Lab - 5K1 Light Chain Variable Region

<400> SEQUENCE: 29

```
Asp Val Val Met Thr Gln Thr Pro Ala Ser Val Glu Ala Ala Val Gly
1               5                   10                  15

Gly Thr Val Thr Ile Lys Cys Gln Ala Ser Gln Ser Ile Arg Thr Ala
            20                  25                  30

Leu Ala Trp Tyr Gln Gln Lys Pro Gly Gln Pro Pro Lys Leu Leu Ile
        35                  40                  45

Ser Asp Thr Ser Asp Leu Ala Ser Gly Val Pro Ser Arg Phe Ser Gly
    50                  55                  60

Ser Gly Ser Gly Thr Glu Phe Thr Leu Thr Ile Ser Gly Val Gln Cys
65              70                  75                  80

Glu Asp Ala Ala Thr Tyr Tyr Cys Gln Ser Tyr Ser Tyr Ser Gly Ser
                85                  90                  95

Arg Asn Tyr Val Phe Gly Gly Gly Thr Glu Val Val Val Lys
            100                 105                 110
```

<210> SEQ ID NO 30
<211> LENGTH: 122
<212> TYPE: PRT
<213> ORGANISM: Artificial Sequence
<220> FEATURE:
<223> OTHER INFORMATION: Made in Lab - 5H1 Heavy Chain Variable Region

<400> SEQUENCE: 30

```
Gln Cys Gln Glu Gln Leu Val Glu Ser Gly Gly Gly Leu Val Gln Pro
1               5                   10                  15

Glu Gly Ser Leu Thr Leu Thr Cys Lys Gly Ser Gly Leu Asp Phe Ser
            20                  25                  30

Ser Tyr Trp Leu Cys Trp Val Arg Gln Ala Pro Gly Lys Gly Leu Glu
        35                  40                  45

Trp Ile Ala Cys Ile Tyr Thr Gly Ser Ser Pro Tyr Ile Asp Tyr Ala
```

```
                50             55                 60
Ser Trp Ala Lys Gly Arg Phe Thr Ile Ser Lys Thr Ser Thr Ser
 65                 70                 75                 80

Val Thr Leu Gln Met Thr Ser Leu Thr Val Ala Asp Thr Ala Thr Tyr
                 85                 90                 95

Phe Cys Ala Arg Val Gly Tyr Gly Glu Ile Thr Tyr Phe Gly Leu Trp
                100                105                110

Gly Gln Gly Thr Leu Val Thr Val Ser Ser
        115                 120

<210> SEQ ID NO 31
<211> LENGTH: 12
<212> TYPE: PRT
<213> ORGANISM: Artificial Sequence
<220> FEATURE:
<223> OTHER INFORMATION: Made in Lab - 6K3 light chain CDR1 sequence

<400> SEQUENCE: 31

Gln Ser Ser Glu Ser Val Tyr Ser Asn Tyr Leu Ser
 1               5                  10

<210> SEQ ID NO 32
<211> LENGTH: 7
<212> TYPE: PRT
<213> ORGANISM: Artificial Sequence
<220> FEATURE:
<223> OTHER INFORMATION: Made in Lab - 6K3 light chain CDR2 sequence

<400> SEQUENCE: 32

Asp Ala Ser Tyr Leu Ala Ser
 1               5

<210> SEQ ID NO 33
<211> LENGTH: 10
<212> TYPE: PRT
<213> ORGANISM: Artificial Sequence
<220> FEATURE:
<223> OTHER INFORMATION: Made in Lab - 6K3 light chain CDR3 sequence

<400> SEQUENCE: 33

Ala Gly Tyr Tyr Ser Gly Val Ile Tyr Ala
 1               5                  10

<210> SEQ ID NO 34
<211> LENGTH: 11
<212> TYPE: PRT
<213> ORGANISM: Artificial Sequence
<220> FEATURE:
<223> OTHER INFORMATION: Made in Lab - 6H2 heavy chain CDR1 sequence

<400> SEQUENCE: 34

Gly Phe Ser Phe Ser Thr Ser Tyr Trp Ile Tyr
 1               5                  10

<210> SEQ ID NO 35
<211> LENGTH: 17
<212> TYPE: PRT
<213> ORGANISM: Artificial Sequence
<220> FEATURE:
<223> OTHER INFORMATION: Made in Lab - 6H2 heavy chain CDR2 sequence

<400> SEQUENCE: 35

His Ile His Thr Gly Thr Asp Asn Thr Tyr Tyr Ala Thr Trp Ala Glu
 1               5                  10                 15
```

Gly

```
<210> SEQ ID NO 36
<211> LENGTH: 9
<212> TYPE: PRT
<213> ORGANISM: Artificial Sequence
<220> FEATURE:
<223> OTHER INFORMATION: Made in Lab - 6H2 heavy chain CDR3 sequence

<400> SEQUENCE: 36

Asp Leu Leu Tyr Asp Asn Ser His Leu
1               5

<210> SEQ ID NO 37
<211> LENGTH: 131
<212> TYPE: PRT
<213> ORGANISM: Artificial Sequence
<220> FEATURE:
<223> OTHER INFORMATION: Made in Lab - 6K3 Light Chain Variable Region

<400> SEQUENCE: 37

Met Asp Thr Arg Ala Pro Thr Gln Leu Leu Gly Leu Leu Leu Leu Trp
1               5                   10                  15

Leu Pro Gly Ala Thr Phe Ala Gln Val Leu Thr Gln Thr Pro Ser Pro
            20                  25                  30

Val Ser Val Ala Val Gly Gly Thr Val Thr Ile Asn Cys Gln Ser Ser
        35                  40                  45

Glu Ser Val Tyr Ser Asn Tyr Leu Ser Trp Tyr Gln Gln Lys Pro Gly
    50                  55                  60

Gln Pro Pro Lys Val Leu Ile Tyr Asp Ala Ser Tyr Leu Ala Ser Gly
65                  70                  75                  80

Val Pro Ser Arg Phe Lys Gly Ser Gly Ser Gly Thr Gln Phe Thr Leu
                85                  90                  95

Thr Ile Ser Asp Met Leu Cys Asp Asp Ala Ala Thr Tyr Tyr Cys Ala
            100                 105                 110

Gly Tyr Tyr Ser Gly Val Ile Tyr Ala Phe Gly Gly Gly Thr Glu Val
        115                 120                 125

Val Val Lys
        130

<210> SEQ ID NO 38
<211> LENGTH: 136
<212> TYPE: PRT
<213> ORGANISM: Artificial Sequence
<220> FEATURE:
<223> OTHER INFORMATION: Made in Lab - 6H2 Heavy Chain Variable Region

<400> SEQUENCE: 38

Met Glu Thr Gly Leu Arg Trp Leu Leu Leu Val Ala Val Leu Lys Gly
1               5                   10                  15

Val Gln Cys Gln Ser Leu Glu Glu Ser Gly Gly Asp Leu Val Lys Pro
            20                  25                  30

Gly Ala Ser Leu Thr Leu Thr Cys Thr Ala Ser Gly Phe Ser Phe Ser
        35                  40                  45

Thr Ser Tyr Trp Ile Tyr Trp Val Arg Gln Ala Pro Gly Lys Gly Leu
    50                  55                  60

Glu Trp Ile Ala His Ile His Thr Gly Thr Asp Asn Thr Tyr Tyr Ala
65                  70                  75                  80

Thr Trp Ala Glu Gly Arg Phe Thr Ile Ser Lys Ala Ser Ser Thr Thr
                85                  90                  95
```

Val Thr Leu Gln Val Thr Ser Leu Thr Ala Ala Asp Thr Ala Thr Tyr
            100                 105                 110

Phe Cys Ala Arg Asp Leu Leu Tyr Asp Asn Ser His Leu Trp Gly Gln
                115                 120                 125

Gly Thr Leu Val Thr Val Ser Ser
            130                 135

<210> SEQ ID NO 39
<211> LENGTH: 109
<212> TYPE: PRT
<213> ORGANISM: Artificial Sequence
<220> FEATURE:
<223> OTHER INFORMATION: Made in Lab - 6K3 Light Chain Variable Region

<400> SEQUENCE: 39

Ala Gln Val Leu Thr Gln Thr Pro Ser Pro Val Ser Val Ala Val Gly
1               5                   10                  15

Gly Thr Val Thr Ile Asn Cys Gln Ser Ser Glu Ser Val Tyr Ser Asn
            20                  25                  30

Tyr Leu Ser Trp Tyr Gln Gln Lys Pro Gly Gln Pro Pro Lys Val Leu
        35                  40                  45

Ile Tyr Asp Ala Ser Tyr Leu Ala Ser Gly Val Pro Ser Arg Phe Lys
    50                  55                  60

Gly Ser Gly Ser Gly Thr Gln Phe Thr Leu Thr Ile Ser Asp Met Leu
65                  70                  75                  80

Cys Asp Asp Ala Ala Thr Tyr Tyr Cys Ala Gly Tyr Tyr Ser Gly Val
                85                  90                  95

Ile Tyr Ala Phe Gly Gly Gly Thr Glu Val Val Val Lys
            100                 105

<210> SEQ ID NO 40
<211> LENGTH: 119
<212> TYPE: PRT
<213> ORGANISM: Artificial Sequence
<220> FEATURE:
<223> OTHER INFORMATION: Made in Lab - 6H2 Heavy Chain Variable Region

<400> SEQUENCE: 40

Gln Cys Gln Ser Leu Glu Glu Ser Gly Gly Asp Leu Val Lys Pro Gly
1               5                   10                  15

Ala Ser Leu Thr Leu Thr Cys Thr Ala Ser Gly Phe Ser Phe Ser Thr
            20                  25                  30

Ser Tyr Trp Ile Tyr Trp Val Arg Gln Ala Pro Gly Lys Gly Leu Glu
        35                  40                  45

Trp Ile Ala His Ile His Thr Gly Thr Asp Asn Thr Tyr Tyr Ala Thr
    50                  55                  60

Trp Ala Glu Gly Arg Phe Thr Ile Ser Lys Ala Ser Ser Thr Thr Val
65                  70                  75                  80

Thr Leu Gln Val Thr Ser Leu Thr Ala Ala Asp Thr Ala Thr Tyr Phe
            85                  90                  95

Cys Ala Arg Asp Leu Leu Tyr Asp Asn Ser His Leu Trp Gly Gln Gly
                100                 105                 110

Thr Leu Val Thr Val Ser Ser
            115

<210> SEQ ID NO 41
<211> LENGTH: 13
<212> TYPE: PRT

```
<213> ORGANISM: Artificial Sequence
<220> FEATURE:
<223> OTHER INFORMATION: Made in Lab - 9K3 light chain CDR1 sequence

<400> SEQUENCE: 41

Gln Ser Ser Gln Ser Val Tyr Val Asn Asn Asp Leu Ala
1               5                   10

<210> SEQ ID NO 42
<211> LENGTH: 7
<212> TYPE: PRT
<213> ORGANISM: Artificial Sequence
<220> FEATURE:
<223> OTHER INFORMATION: Made in Lab - 9K3 light chain CDR2 sequence

<400> SEQUENCE: 42

Arg Ala Ser Lys Leu Ala Ser
1               5

<210> SEQ ID NO 43
<211> LENGTH: 11
<212> TYPE: PRT
<213> ORGANISM: Artificial Sequence
<220> FEATURE:
<223> OTHER INFORMATION: Made in Lab - 9K3 light chain CDR3 sequence

<400> SEQUENCE: 43

Leu Gly Gly Tyr Asp Asp Asp Ala His Asn Ala
1               5                   10

<210> SEQ ID NO 44
<211> LENGTH: 10
<212> TYPE: PRT
<213> ORGANISM: Artificial Sequence
<220> FEATURE:
<223> OTHER INFORMATION: Made in Lab - 9H2 heavy chain CDR1 sequence

<400> SEQUENCE: 44

Gly Ile Asp Leu Ser Ser Asn Asn Met Ala
1               5                   10

<210> SEQ ID NO 45
<211> LENGTH: 16
<212> TYPE: PRT
<213> ORGANISM: Artificial Sequence
<220> FEATURE:
<223> OTHER INFORMATION: Made in Lab - 9H2 heavy chain CDR2 sequence

<400> SEQUENCE: 45

Trp Ile Ser Ser Ser Gly Ser Thr Tyr Tyr Ala Ser Trp Ala Lys Gly
1               5                   10                  15

<210> SEQ ID NO 46
<211> LENGTH: 12
<212> TYPE: PRT
<213> ORGANISM: Artificial Sequence
<220> FEATURE:
<223> OTHER INFORMATION: Made in Lab - 9H2 heavy chain CDR3 sequence

<400> SEQUENCE: 46

Gly Pro Gly Trp Asp Thr Gly Ile Leu Phe Ser Leu
1               5                   10

<210> SEQ ID NO 47
<211> LENGTH: 133
<212> TYPE: PRT
<213> ORGANISM: Artificial Sequence
```

```
<220> FEATURE:
<223> OTHER INFORMATION: Made in Lab - 9K3 Light Chain Variable Region

<400> SEQUENCE: 47

Met Asp Thr Arg Ala Pro Thr Gln Leu Leu Gly Leu Leu Leu Trp
1               5                   10                  15

Leu Pro Gly Ala Thr Phe Ala Ala Val Leu Thr Gln Thr Pro Ser Pro
            20                  25                  30

Val Ser Ala Ala Val Gly Gly Thr Val Thr Ile Ser Cys Gln Ser Ser
            35                  40                  45

Gln Ser Val Tyr Val Asn Asn Asp Leu Ala Trp Tyr Gln Gln Lys Pro
        50                  55                  60

Gly Gln Pro Pro Lys Leu Leu Ile Tyr Arg Ala Ser Lys Leu Ala Ser
65                  70                  75                  80

Gly Val Thr Ser Arg Phe Ser Gly Ser Gly Ser Gly Thr Gln Phe Thr
                85                  90                  95

Leu Thr Ile Ser Gly Val Gln Cys Asp Asp Ala Ala Thr Tyr Tyr Cys
            100                 105                 110

Leu Gly Gly Tyr Asp Asp Asp Ala His Asn Ala Phe Gly Gly Gly Thr
            115                 120                 125

Glu Val Val Val Lys
        130

<210> SEQ ID NO 48
<211> LENGTH: 137
<212> TYPE: PRT
<213> ORGANISM: Artificial Sequence
<220> FEATURE:
<223> OTHER INFORMATION: Made in Lab - 9H2 Heavy Chain Variable Region

<400> SEQUENCE: 48

Met Glu Thr Gly Leu Arg Trp Leu Leu Leu Val Ala Val Leu Lys Gly
1               5                   10                  15

Val Gln Cys Gln Ser Val Glu Glu Ser Gly Gly Arg Leu Val Thr Pro
            20                  25                  30

Gly Thr Pro Leu Thr Leu Thr Cys Thr Val Ser Gly Ile Asp Leu Ser
            35                  40                  45

Ser Asn Asn Met Ala Trp Val Arg Gln Ser Pro Gly Glu Gly Leu Glu
        50                  55                  60

Tyr Ile Gly Trp Ile Ser Ser Gly Ser Thr Tyr Tyr Ala Ser Trp
65                  70                  75                  80

Ala Lys Gly Arg Phe Thr Ile Ser Lys Ala Ser Ser Thr Thr Val Asp
                85                  90                  95

Leu Lys Met Thr Ser Leu Thr Pro Glu Asp Thr Ala Thr Tyr Phe Cys
            100                 105                 110

Ala Arg Gly Pro Gly Trp Asp Thr Gly Ile Leu Phe Ser Leu Trp Gly
            115                 120                 125

Gln Gly Thr Leu Val Thr Val Ser Ser
        130                 135

<210> SEQ ID NO 49
<211> LENGTH: 111
<212> TYPE: PRT
<213> ORGANISM: Artificial Sequence
<220> FEATURE:
<223> OTHER INFORMATION: Made in Lab - 9K3 Light Chain Variable Region

<400> SEQUENCE: 49
```

-continued

Ala Ala Val Leu Thr Gln Thr Pro Ser Pro Val Ser Ala Val Gly
1               5                   10                  15

Gly Thr Val Thr Ile Ser Cys Gln Ser Ser Gln Ser Val Tyr Val Asn
                20                  25                  30

Asn Asp Leu Ala Trp Tyr Gln Gln Lys Pro Gly Gln Pro Pro Lys Leu
            35                  40                  45

Leu Ile Tyr Arg Ala Ser Lys Leu Ala Ser Gly Val Thr Ser Arg Phe
        50                  55                  60

Ser Gly Ser Gly Ser Gly Thr Gln Phe Thr Leu Thr Ile Ser Gly Val
65                  70                  75                  80

Gln Cys Asp Asp Ala Ala Thr Tyr Tyr Cys Leu Gly Gly Tyr Asp Asp
                85                  90                  95

Asp Ala His Asn Ala Phe Gly Gly Gly Thr Glu Val Val Val Lys
                100                 105                 110

<210> SEQ ID NO 50
<211> LENGTH: 120
<212> TYPE: PRT
<213> ORGANISM: Artificial Sequence
<220> FEATURE:
<223> OTHER INFORMATION: Made in Lab - 9H2 Heavy Chain Variable Region

<400> SEQUENCE: 50

Gln Cys Gln Ser Val Glu Glu Ser Gly Gly Arg Leu Val Thr Pro Gly
1               5                   10                  15

Thr Pro Leu Thr Leu Thr Cys Thr Val Ser Gly Ile Asp Leu Ser Ser
                20                  25                  30

Asn Asn Met Ala Trp Val Arg Gln Ser Pro Gly Glu Gly Leu Glu Tyr
            35                  40                  45

Ile Gly Trp Ile Ser Ser Gly Ser Thr Tyr Tyr Ala Ser Trp Ala
        50                  55                  60

Lys Gly Arg Phe Thr Ile Ser Lys Ala Ser Thr Thr Val Asp Leu
65                  70                  75                  80

Lys Met Thr Ser Leu Thr Pro Glu Asp Thr Ala Thr Tyr Phe Cys Ala
                85                  90                  95

Arg Gly Pro Gly Trp Asp Thr Gly Ile Leu Phe Ser Leu Trp Gly Gln
                100                 105                 110

Gly Thr Leu Val Thr Val Ser Ser
        115                 120

<210> SEQ ID NO 51
<211> LENGTH: 97
<212> TYPE: PRT
<213> ORGANISM: Homo sapiens

<400> SEQUENCE: 51

Gly Ser Ile Leu Trp His Glu Met Trp His Glu Gly Leu Glu Glu Ala
1               5                   10                  15

Ser Arg Leu Tyr Phe Gly Glu Arg Asn Val Lys Gly Met Phe Glu Val
                20                  25                  30

Leu Glu Pro Leu His Ala Met Met Glu Arg Gly Pro Gln Thr Leu Lys
            35                  40                  45

Glu Thr Ser Phe Asn Gln Ala Tyr Gly Arg Asp Leu Met Glu Ala Gln
        50                  55                  60

Glu Trp Cys Arg Lys Tyr Met Lys Ser Gly Asn Val Lys Asp Leu Leu
65                  70                  75                  80

Gln Ala Trp Asp Leu Tyr Tyr His Val Phe Arg Arg Ile Ser Lys Ala

-continued

```
                85                  90                  95
Ser

<210> SEQ ID NO 52
<211> LENGTH: 5
<212> TYPE: PRT
<213> ORGANISM: Artificial Sequence
<220> FEATURE:
<223> OTHER INFORMATION: Peptide linker sequence

<400> SEQUENCE: 52

Asp Gly Gly Gly Ser
1               5

<210> SEQ ID NO 53
<211> LENGTH: 5
<212> TYPE: PRT
<213> ORGANISM: Artificial Sequence
<220> FEATURE:
<223> OTHER INFORMATION: Peptide linker sequence

<400> SEQUENCE: 53

Thr Gly Glu Lys Pro
1               5

<210> SEQ ID NO 54
<211> LENGTH: 4
<212> TYPE: PRT
<213> ORGANISM: Artificial Sequence
<220> FEATURE:
<223> OTHER INFORMATION: Peptide linker sequence

<400> SEQUENCE: 54

Gly Gly Arg Arg
1

<210> SEQ ID NO 55
<211> LENGTH: 5
<212> TYPE: PRT
<213> ORGANISM: Artificial Sequence
<220> FEATURE:
<223> OTHER INFORMATION: Peptide linker sequence

<400> SEQUENCE: 55

Gly Gly Gly Gly Ser
1               5

<210> SEQ ID NO 56
<211> LENGTH: 14
<212> TYPE: PRT
<213> ORGANISM: Artificial Sequence
<220> FEATURE:
<223> OTHER INFORMATION: Peptide linker sequence

<400> SEQUENCE: 56

Glu Gly Lys Ser Ser Gly Ser Gly Ser Glu Ser Lys Val Asp
1               5                   10

<210> SEQ ID NO 57
<211> LENGTH: 18
<212> TYPE: PRT
<213> ORGANISM: Artificial Sequence
<220> FEATURE:
<223> OTHER INFORMATION: Peptide linker sequence

<400> SEQUENCE: 57
```

```
Lys Glu Ser Gly Ser Val Ser Ser Glu Gln Leu Ala Gln Phe Arg Ser
1               5                   10                  15

Leu Asp

<210> SEQ ID NO 58
<211> LENGTH: 8
<212> TYPE: PRT
<213> ORGANISM: Artificial Sequence
<220> FEATURE:
<223> OTHER INFORMATION: Peptide linker sequence

<400> SEQUENCE: 58

Gly Gly Arg Arg Gly Gly Gly Ser
1               5

<210> SEQ ID NO 59
<211> LENGTH: 9
<212> TYPE: PRT
<213> ORGANISM: Artificial Sequence
<220> FEATURE:
<223> OTHER INFORMATION: Peptide linker sequence

<400> SEQUENCE: 59

Leu Arg Gln Arg Asp Gly Glu Arg Pro
1               5

<210> SEQ ID NO 60
<211> LENGTH: 12
<212> TYPE: PRT
<213> ORGANISM: Artificial Sequence
<220> FEATURE:
<223> OTHER INFORMATION: Peptide linker sequence

<400> SEQUENCE: 60

Leu Arg Gln Lys Asp Gly Gly Ser Glu Arg Pro
1               5                   10

<210> SEQ ID NO 61
<211> LENGTH: 16
<212> TYPE: PRT
<213> ORGANISM: Artificial Sequence
<220> FEATURE:
<223> OTHER INFORMATION: Peptide linker sequence

<400> SEQUENCE: 61

Leu Arg Gln Lys Asp Gly Gly Gly Ser Gly Gly Gly Ser Glu Arg Pro
1               5                   10                  15

<210> SEQ ID NO 62
<211> LENGTH: 4
<212> TYPE: PRT
<213> ORGANISM: Artificial Sequence
<220> FEATURE:
<223> OTHER INFORMATION: Exemplary rule for determining light chain
      CDR-L3 motif
<220> FEATURE:
<221> NAME/KEY: MOD_RES
<222> LOCATION: (3)..(3)
<223> OTHER INFORMATION: Xaa is any amino acid

<400> SEQUENCE: 62

Phe Gly Xaa Gly
1

<210> SEQ ID NO 63
<211> LENGTH: 4
<212> TYPE: PRT
```

```
<213> ORGANISM: Artificial Sequence
<220> FEATURE:
<223> OTHER INFORMATION: Exemplary rule for determining heavy chain
      CDR-H1 motif
<220> FEATURE:
<221> NAME/KEY: MOD_RES
<222> LOCATION: (2)..(4)
<223> OTHER INFORMATION: Xaa is any amino acid

<400> SEQUENCE: 63

Cys Xaa Xaa Xaa
1

<210> SEQ ID NO 64
<211> LENGTH: 5
<212> TYPE: PRT
<213> ORGANISM: Artificial Sequence
<220> FEATURE:
<223> OTHER INFORMATION: Exemplary rule for determining heavy chain
      CDR-H2 motif

<400> SEQUENCE: 64

Leu Glu Trp Ile Gly
1               5

<210> SEQ ID NO 65
<211> LENGTH: 4
<212> TYPE: PRT
<213> ORGANISM: Artificial Sequence
<220> FEATURE:
<223> OTHER INFORMATION: Exemplary rule for determining heavy chain
      CDR-H3 motif
<220> FEATURE:
<221> NAME/KEY: MOD_RES
<222> LOCATION: (3)..(3)
<223> OTHER INFORMATION: Xaa is any amino acd

<400> SEQUENCE: 65

Trp Gly Xaa Gly
1
```